United States Patent
Price

(10) Patent No.: US 8,349,080 B1
(45) Date of Patent: Jan. 8, 2013

(54) MICRO-MANIPULATOR MACHINE FOR HARVESTING AND CRYOFREEZING CRYSTALS

(75) Inventor: John C. Price, Rancho Mirage, CA (US)

(73) Assignee: West Bond, Inc., Anaheim, CA (US)

( * ) Notice: Subject to any disclaimer, the term of this patent is extended or adjusted under 35 U.S.C. 154(b) by 1078 days.

(21) Appl. No.: 12/313,766

(22) Filed: Nov. 24, 2008

(51) Int. Cl.
  C30B 35/00 (2006.01)
  C30B 13/28 (2006.01)
  C30B 15/30 (2006.01)
  C30B 13/00 (2006.01)
  C30B 21/04 (2006.01)
  C30B 28/08 (2006.01)

(52) U.S. Cl. .................. 117/220; 117/200; 117/202

(58) Field of Classification Search .................. 117/200, 117/202, 220
  See application file for complete search history.

(56) References Cited

U.S. PATENT DOCUMENTS

| | | | | |
|---|---|---|---|---|
| 3,096,155 A | * | 7/1963 | Evans et al. | 117/87 |
| 3,915,661 A | * | 10/1975 | Vichr | 117/56 |
| 6,417,007 B1 | * | 7/2002 | Gittleman et al. | 436/180 |
| 2007/0140421 A1 | * | 6/2007 | Kucharczyk et al. | 378/46 |

* cited by examiner

Primary Examiner — James McDonough
(74) Attorney, Agent, or Firm — William L. Chapin

(57) ABSTRACT

A micro-manipulator machine for harvesting and cryofreezing crystals for cryogenic storage and subsequent analysis includes a micropositioner mechanism for converting motions manually input to a position control knob to fractionally-scaled motions of a follower mechanism which includes a tool head support arm and tool head that releasably holds a filamentary polymer cryoloop for immersion into a liquid crystal growth media and extraction of a liquid drop containing a selected crystal from the media. A first automatic actuator mechanism orbits the tool head support arm, tool head, cryoloop, liquid drop and harvested crystal from a harvesting location to a retrieval location when the micropositioner input control arm has been moved manually away from the crystal harvesting location by the operator after extracting a crystal drop, and a second automatic actuator mechanism pivots the toll head into a flowing stream of a cryogenic gas to freeze the liquid drop and crystal.

23 Claims, 21 Drawing Sheets

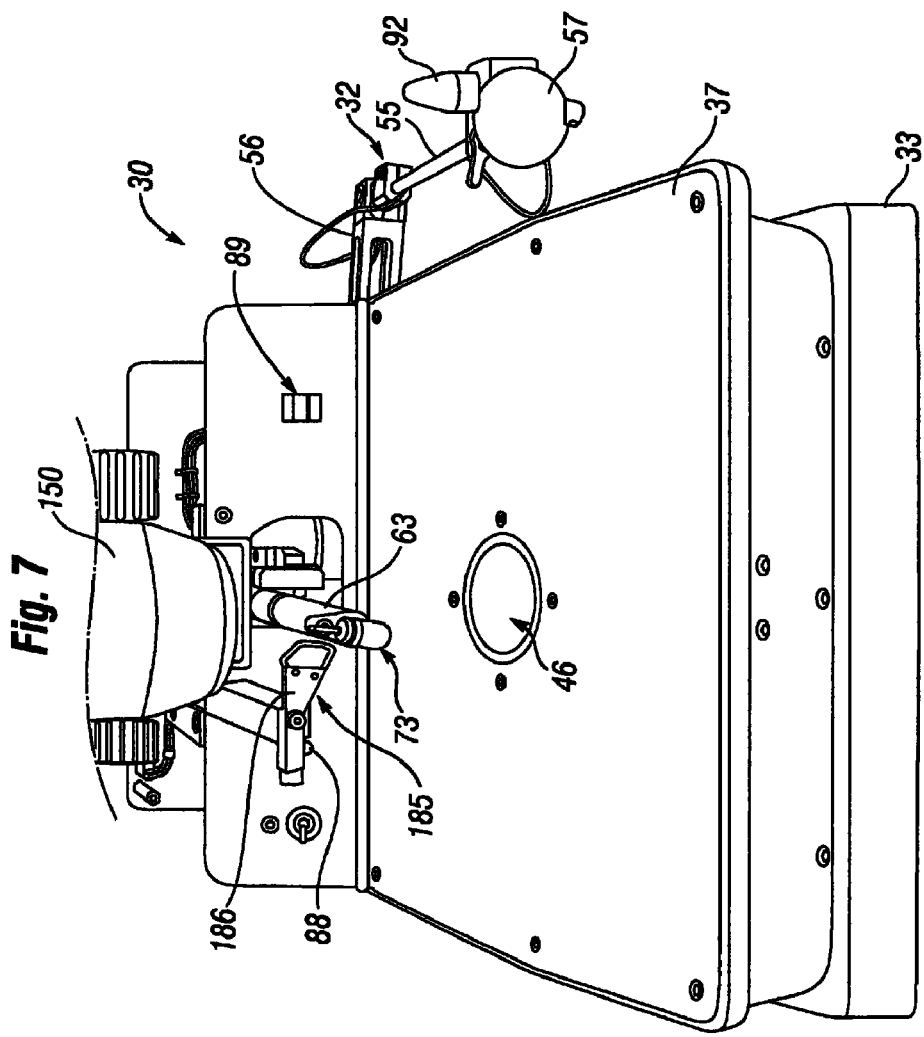

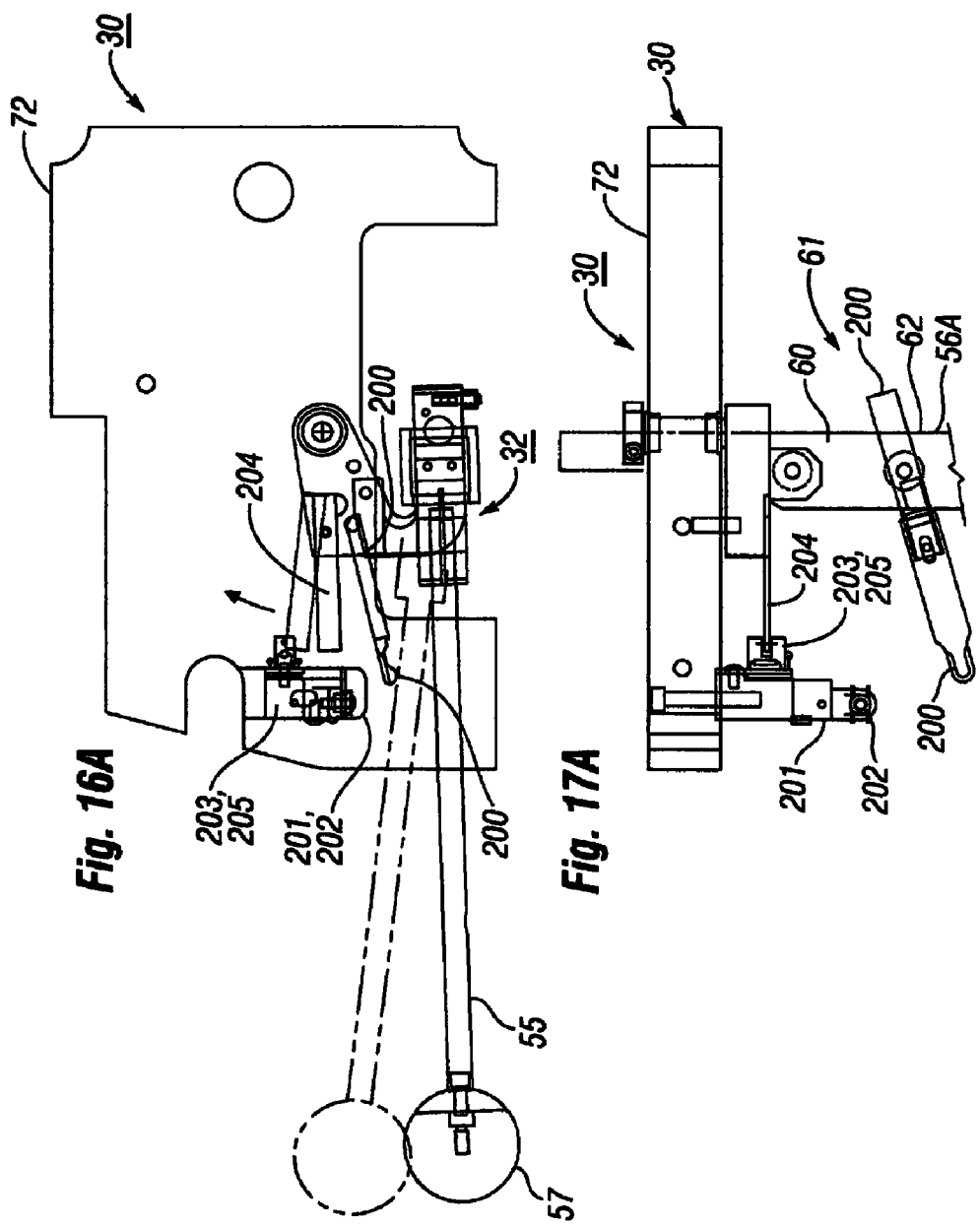

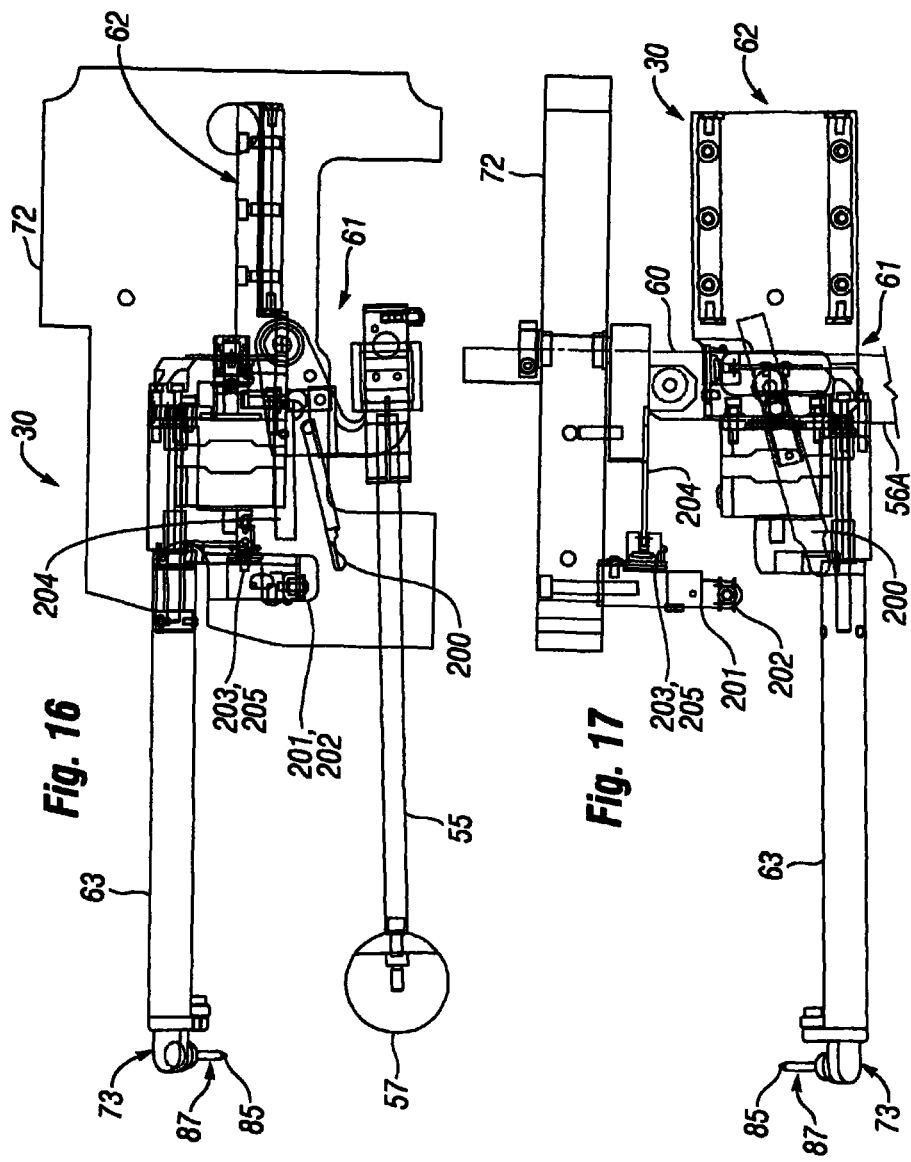

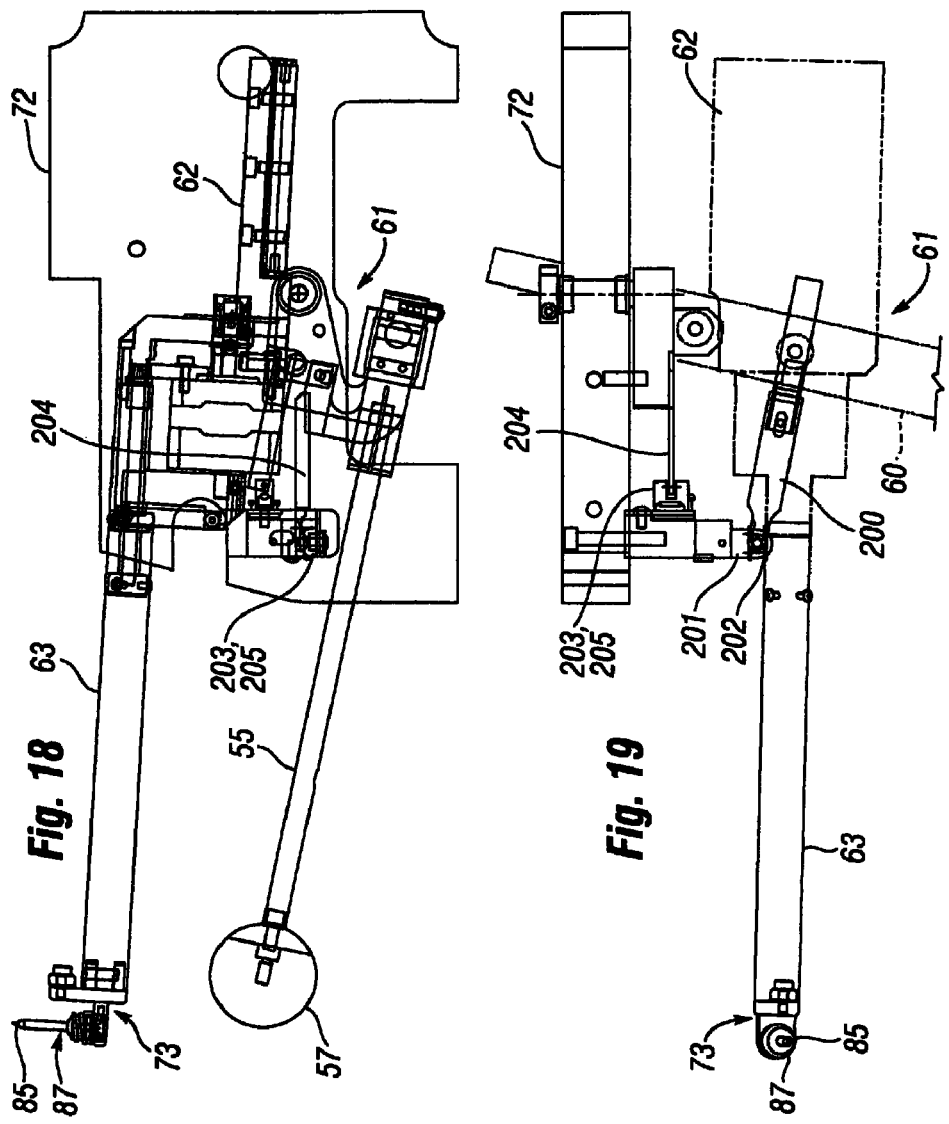

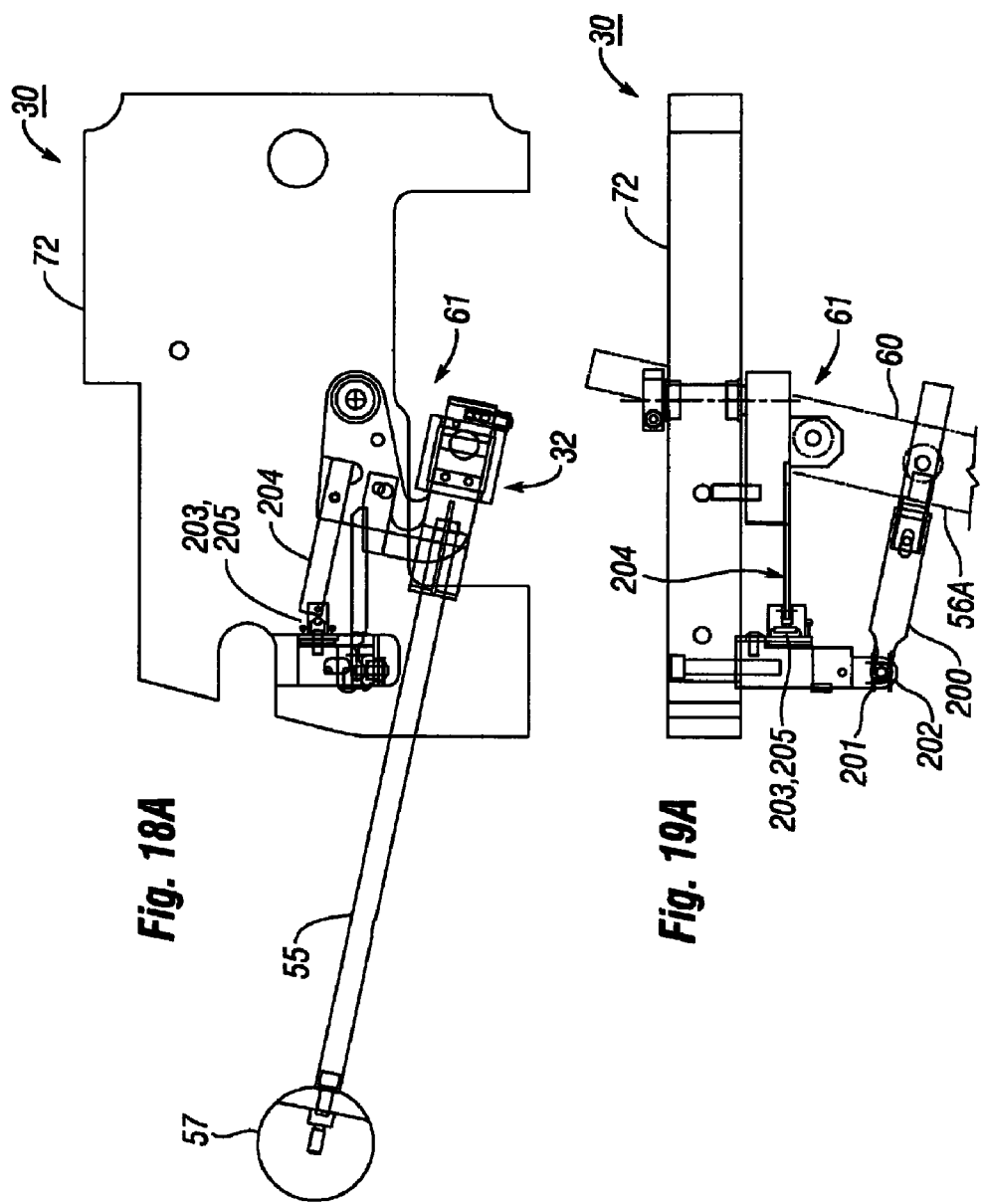

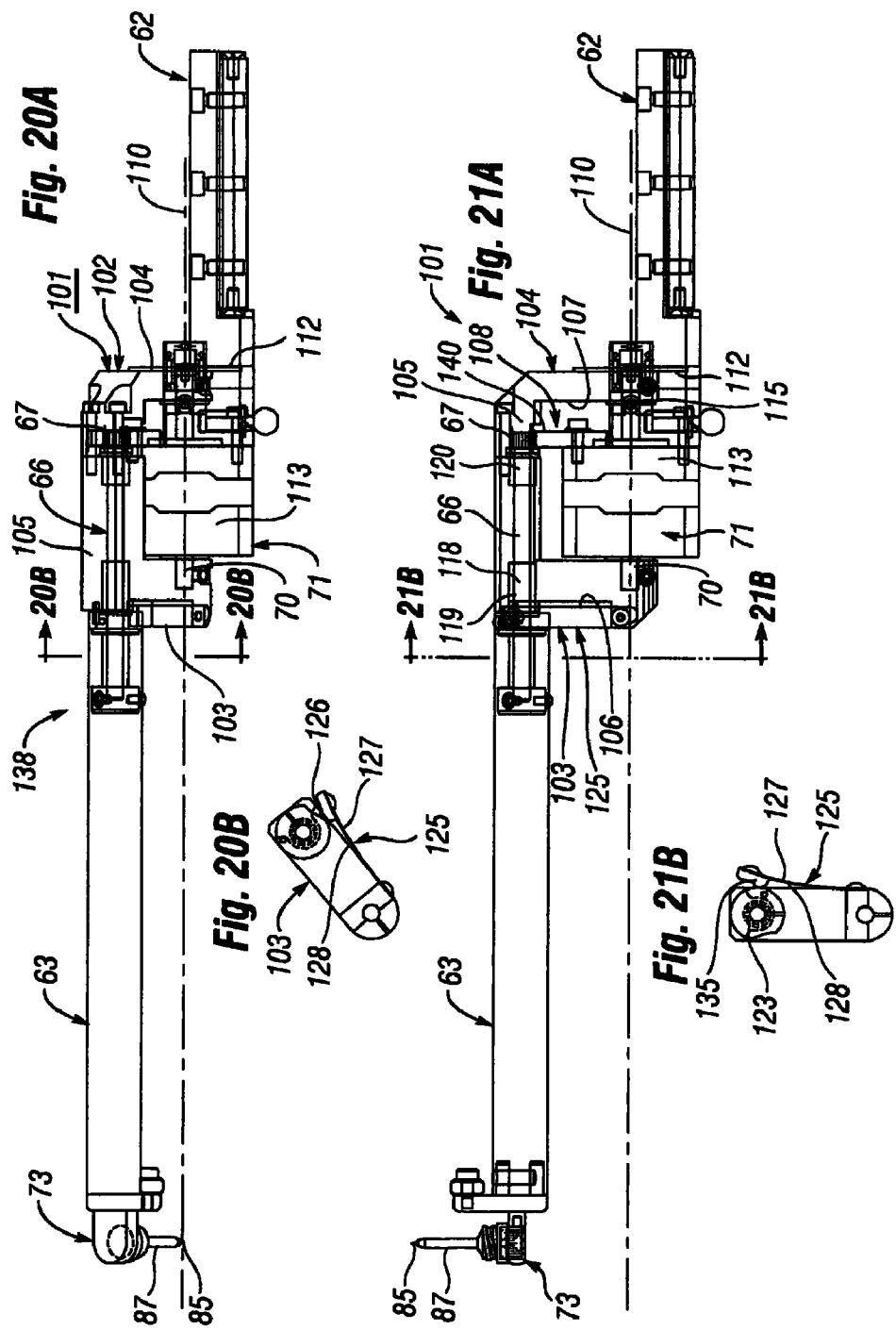

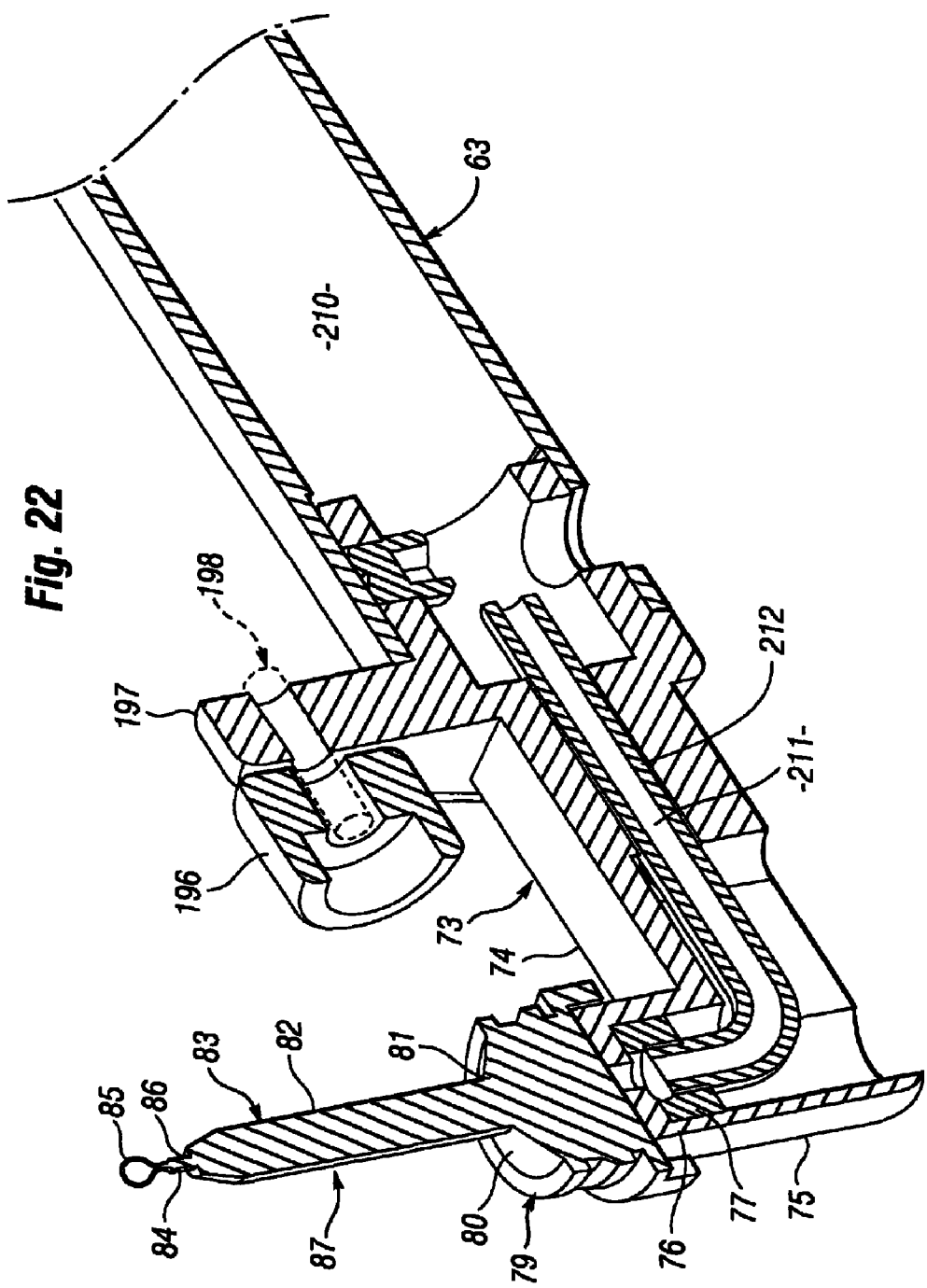

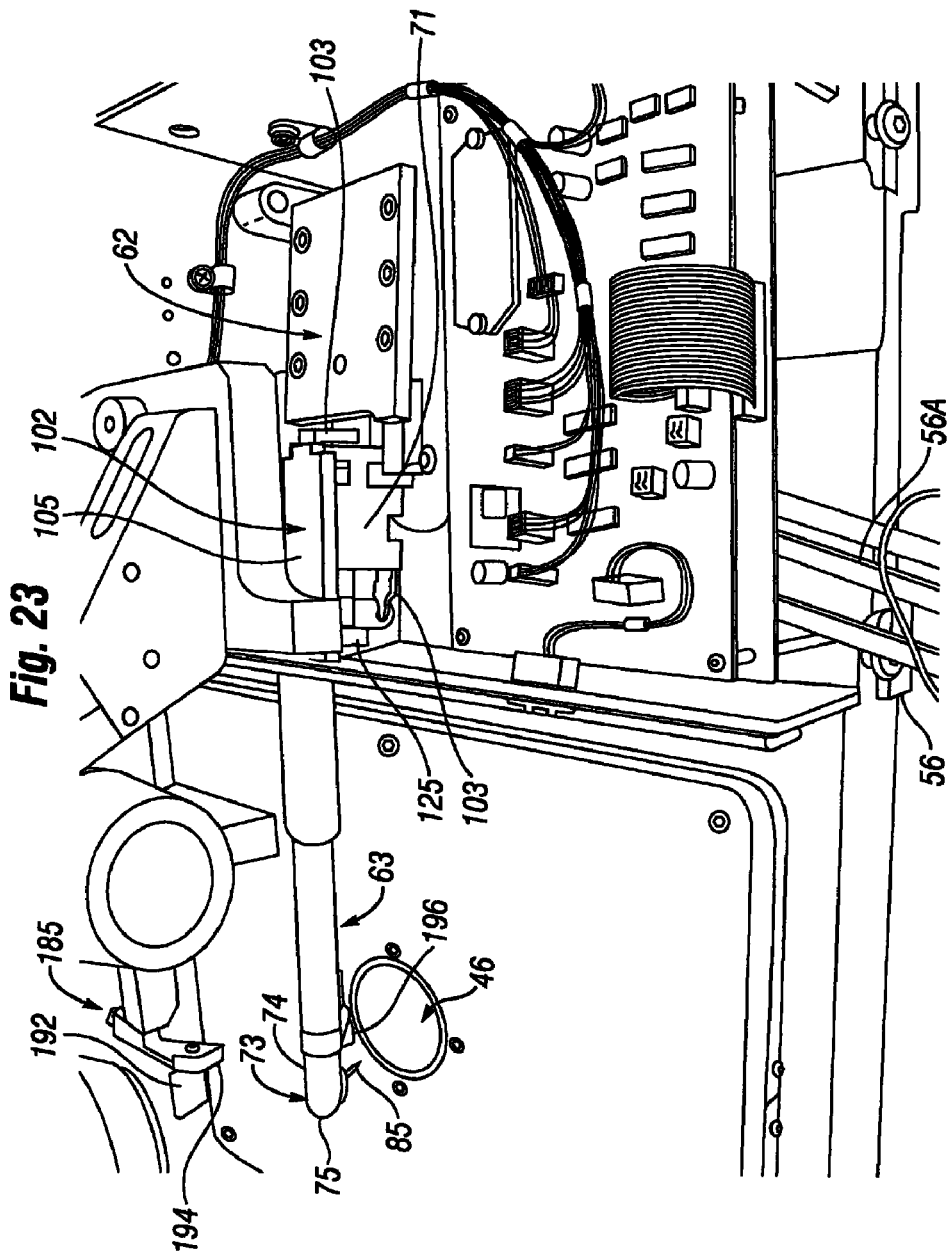

MICRO-MANIPULATOR MACHINE FOR HARVESTING AND CRYOFREEZING CRYSTALS

BACKGROUND OF THE INVENTION

A. Field of the Invention

The present invention relates to apparatus used to facilitate the laboratory production of small organic crystals in the approximate size range of 10 microns or less. More particularly, the invention relates to a micropositioner machine for extracting or "harvesting" individual micron-size protein crystals from a liquid in which the crystals are grown, and cryofreezing and storing the extracted crystals for subsequent crystallographic analysis.

B. Description of Background Art

The development of new therapeutic drugs by medical researchers, particularly those containing biochemicals, has in recent times benefited from an energizing technology in which individual protein crystals having particular structural characteristics are grown and tested for therapeutic efficiency. This technology is useful because of the discovery that interactions between proteins and other biochemicals with living organisms depend not only on the chemical composition of a biochemical, but also upon its physical structure. Thus, many biochemical reactions at the cellular level proceed at an accelerated rate if biochemical and cellular sites have complementary shapes, e.g., analogous to a triangular peg having an appropriate shape and size for fitting into a triangular recess, or vice versa. Conversely, a mismatch between the structures of a cellular binding site and a biochemical characterized by non-complementary shapes, results in situations somewhat analogous to trying to fit a square peg into a round hole. In such cases, the reaction rate between a cell and a biochemical may be unacceptably low.

For the foregoing reasons, medical and biochemical researchers have devoted increased attention to techniques for producing individual crystals, such as protein crystals, which have specific shapes or other structural characteristics.

According to one technique for producing protein crystals with particular from which a crystal is to be grown, along with some sort of agent such as a fragment of a crystal of the type to be grown, to act as a seed for initiating crystallization from the liquid, which is sometimes referred to as a liquor.

Typically, protein crystals having selected structures are developed by growing individual crystals from liquid contained in small individual wells formed in the upper surface of a plate. Typical plates used for the cultivation of protein crystals are rectangularly shaped, flat plates which are several centimeters on a side. Each plate has a matrix, typically rectangularly shaped, of separate, individual wells. For example, a 96-well "sitting-drop" plate may have 96 wells, each capable of holding a one-micro liter drop of crystal growth solution. Another typical cell cultivating plate has 24 2-micro liter wells.

After each well in a crystal growth plate has been filled with a desired volume of a crystal growth cocktail, a predetermined time period is allowed to elapse to thereby enable growth of crystals in each cell. The crystal growth plate is then positioned in the field of view of a stereo microscope, as a first step in extracting or "harvesting" individual crystals by a human or robotic operator.

According to a presently employed method of harvesting individual protein crystals from crystal growth wells, a human operator uses an elongated pick-up tool holder which has a small diameter planar pick-up loop protruding from its end. The pick-up or "harvester" loop sometimes referred to as a "cryoloop" is removably attached to the tool holder, has a diameter in the range of about 0.05 mm. to 1 mm., and is typically made of a looped filament of nylon, etched Kapton, or other hydrophobic material, which has a typical diameter of about 10 micrometers.

With the aid of the microscope, the human operator looks into the liquid cocktail to determine if one or more crystals are present. If more than one are present, they may be attached to each other and therefore need to be separated. The separation may be accomplished manually using a very small knife blade. Alternatively, the knife blade may be mounted on the tool arm of the micro manipulator machine for finer position control to separate the crystals.

With the aid of the microscope, the human operator inserts the harvester cryoloop into a solution in a well in which the crystals are grown, at an oblique angle to encircle a crystal contained in the solution. The tool, with the cryoloop and an attached liquid drop containing a crystal suspended in the solution by surface tension of the liquid, is then withdrawn upwardly from the crystal growth well.

A final step in harvesting individual crystals includes freezing a cryoloop holding a liquid drop and a crystal by exposing the loop and drop to a stream of a cryogenic gas, such as nitrogen evaporated from liquid nitrogen. This action, referred to as cryocooling or cryofreezing, freezes the crystals, liquid and cryoloop together, whereupon the cryoloop is removed from the tool holder, and placed in a cryogenic storage compartment cooled by a cryogenic fluid such as a liquid nitrogen or liquid propane.

Individual cryoloops each containing a crystal are subsequently analyzed by X-ray diffraction methods to determine whether the crystal has desired structural properties.

Because of the small sizes of protein crystals and the drops of liquid from which they form, it can be readily appreciated that the task of harvesting and storing the crystals requires moving the cryoloop in very small, precisely controllable increments. Accordingly, it would be desirable to provide an apparatus which has a capability for precisely manipulating a small cryoloop to extract small liquid drops containing protein crystals from growth wells, and cryofreezing the loop, liquid drop and crystals en masse for subsequent X-ray diffraction analysis and processing.

A method of Operator-Assisted Harvesting Of Protein Crystals Using A Universal Micro Manipulating Robot was described in an article of that title appearing in the *Journal of Applied Crystallography* (2007) 40. pp. 539-545. The entire contents of that article, which are directed to a fully automatic crystal harvesting method, are incorporated by reference into the present application.

The present invention was conceived of in part to provide a micro-manipulator machine for crystal harvesting which could substantially enhance the speed and precision with which a human operator could perform harvesting and preservation of protein crystals from small individual crystal growth wells.

OBJECTS OF THE INVENTION

An object of the present invention is to provide a micromanipulator machine for harvesting and cryofreezing crystals which facilitates manipulation of a tiny filamentary cryoloop tool to extract micro-liter size drops of liquid containing a selected crystal from micro-liter size crystal growth wells.

Another object of the invention is to provide a micromanipulator machine for harvesting and cryofreezing crystals which includes a micropositioner mechanism that utilizes a manually operable input control arm coupled through a mechanical linkage mechanism to a follower mechanism on which is mounted a tool holder support arm having at a front outer end thereof a tool head for releasably holding a cryoloop useable for crystal harvesting, the linkage mechanism being so constructed as to cause the tool holder to move translationally in small fractions of displacements of a hand-manipulatable position control knob attached to the end of the control arm, thus enabling a cryoloop held in the tool holder to be precisely manipulated in motion increments which are fractional ratios of motions of the position control knob.

Another object of the invention is to provide a micromanipulator machine for harvesting and cryofreezing crystals which includes a micropositioner mechanism that uses a pantograph-type motion divider mechanism for translationally moving a cryoloop at the tip of a tool head in coordinate displacements in a work space which are predetermined fractional ratios of translational motions in a control space input by hand motions of a human operator to a position control knob, and which includes a rotary actuator mechanism for rotating the tool holder arm to thus rotate a cryoloop at the end of the arm to adjustable inclination angles.

Another object of the invention is to provide a micromanipulator machine for harvesting and cryofreezing crystals which includes a micropositioner mechanism that mechanically couples motions of a manually graspable position control knob at an input end of a motion control mechanism input control arm to a follower mechanism which has coupled thereto a tool arm and tool head that is moved translationally in co-ordinate directions in response to motions of the input position control knob, but at fractional ratios of displacements of the position control knob, and which includes a tool head angle control mechanism that enables the vertical inclination angle of a cryoloop held in the tool head to be remotely controlled by an angle control knob located on the input control arm near the position control knob.

Another object of the invention is to provide a micromanipulator machine for crystal harvesting and cryofreezing crystals which includes a micropositioner mechanism for moving a tool head and protruding cryoloop in a work space above a work platform located remotely from a position control knob, in precisely scaled fractional ratios of motions of the position control knob in an input control coordinate space, and a rotary actuator mechanism for rotating the tool head and cryoloop to adjustable angles relative to a vertical axis through the tool holder and work table. Another object of the invention is to provide a micro-manipulator machine for harvesting and cryofreezing crystals which includes a micropositioner mechanism for translationally moving a tool head and cryoloop mounted therein in a work space above a work platform in response to movements of a remotely located position control knob, an angle control actuator responsive to movements by a human operator of an angle control knob coupled to an angle control encoder located near the hand control knob for adjusting an inclination angle of the tool head and cryoloop relative to a vertical axis of the work platform; and a tool arm support crank mechanism for orbitally moving the tool head and cryoloop upwards from the work platform towards a docking station and thus repositioning the tool head and cryoloop from a downwardly angled work orientation close to the work platform to a vertically upwardly oriented access position above the platform.

Another object of the invention is to provide a micromanipulator machine for harvesting and cryofreezing crystals which includes a micropositioner mechanism for remotely positioning the translational position of the tip of a cryoloop held in a tool holder above a work platform, an angle control mechanism for controlling the inclination angle of the cryoloop, a tool arm support crank mechanism for orbitally moving the tool head and cryoloop upwards from the work platform towards a docking station, and thus positioning the tool head in an upwardly pointing orientation for removal and replacement of a cryoloop held within the holder, when the micropositioner mechanism has been used to move the tool head to an upward, horizontally centered location at which a docking arm protruding from the tool head support mechanism is proximate a docking site.

Another object of the invention is to provide a micromanipulator machine for harvesting and cryofreezing crystals which includes a micropositioner mechanism for remotely controlling the vertical and lateral and fore-and-aft horizontal positions of a tool head holding a crystal harvester cryoloop, an angle control mechanism including a rotary actuator for controlling the inclination angle of the cryoloop relative to crystal growth wells in a plate placed on a work platform below the tool head, a docking station for contacting a docking arm of the micropositioner mechanism when the tool head has been moved upwards from a crystal growth well after the cryoloop has been inserted into a drop of liquid to thereby encircle and hold by surface tension a crystal, and retracted from the well, a tool arm support crank mechanism for orbitally moving the tool arm and head vertically upwards a substantial predetermined position above the work platform and proximate the docking station when the cryoloop has been withdrawn a predetermined distance upwards from the crystal growth well, and a pivoting mechanism for pivoting the tool head from an upward vertical orientation to an upward laterally inclined position to thereby displace a pivotable shutter from a position blocking a cryogenic gas stream for a selectable predetermined time period sufficient to enable cryogenic gas to freeze the liquid drop, crystals and cryoloop, the pivoting mechanism then pivoting the tool head to an upright vertical position to thus allow the pivotal shutter to return to a position blocking flow of cryogenic gas and enable removal of the cryoloop and frozen liquid drop and crystals for storage in a cryogenic storage area, and replacement of the removed cryoloop with a new cryoloop to enable subsequent crystal harvesting.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a micromanipulator machine for harvesting and cryofreezing small crystals contained in small drops of liquid.

The machine according to the invention includes a manually operable micropositioner apparatus for remotely and precisely positioning the tip of a tool held in a tool head in a three-dimensional work space located above a tabular work platform which extends forward from a lower part of a front control panel of the machine.

In a preferred embodiment of a micro-manipulator machine for harvesting and cryofreezing crystals according to the present invention, the micropositioner apparatus includes an elongated, fore-and-aft disposed, generally horizontal input control arm coupled by a motion-dividing, pantograph-type bar-linkage coupler mechanism to a follower mechanism which supports a tool head support arm mount assembly. The tool head support arm mount assembly has protruding forward therefrom an elongated, straight tool head support arm which is parallel to the control arm, and protrudes forward through a central clearance opening in a front control panel of the machine that is located above and laterally displaced to the left of the control arm. The control arm protrudes forward of the front control panel, at a location offset to the right of the work platform. A tool head located at the front, outer end of the tool head support arm removably holds a tool, such as a cryoloop.

According to the invention, the linkage mechanism of the micropositioner is constructed so as to cause the cryoloop held in the tool holder to move translationally in three orthogonal directions in a three dimensional work space, motions of the cryoloop being predetermined fractional ratios of motions in a three-dimensional control space of a position control knob attached to the front end of the input control arm, the position control knob being manually manipulatable by a human operator.

According to the invention the tool head support arm, which preferably has a hollow tubular construction, protrudes forward in a generally horizontal direction from the tool head support arm mount assembly, and through the clearance opening through the front control panel of the machine. The tool head support arm is disposed coaxially through a tubular bearing support attached to the tool head support arm mount assembly.

An outer, front end of the tool head support arm has attached thereto an L-shaped tool head which holds a cryoloop. The tool head has a short, straight rear, longitudinally disposed leg fastened to the tool head support arm, and a short front transversely disposed leg which protrudes perpendicularly from the front end of the rear leg, and is thus disposed radially to the tool head support arm and lies generally in a vertical plane.

The front transverse leg of the L-shaped tool head has located in a transversely disposed outer end thereof a cylindrically-shaped socket for removably holding by magnetic force a cylindrically-shaped cryoloop support cap. The support cap has disposed axially inwardly from an outer frustoconically shaped transverse face thereof a centrally located blind cryopin mounting bore.

The cryopin mounting bore is provided for receiving the inner end of a straight cryoloop pin which has protruding from an outer end thereof a small, planar cryoloop made of a thin filament of nylon, Kapton or the like. The plane of the loop is oriented generally parallel to the longitudinal axis of the cryoloop pin, and the cryoloop support cap is manually rotatable about its axis to orient the plane of the loop at selectable azimuth angles with respect to the co-linear axes of the outer, transverse leg of the tool holder, the cryoloop support cap and the cryoloop pin. As will be explained below, the cryoloop is used to extract or "harvest" a drop of liquid containing a crystal held in the liquid drop by surface tension, from individually selected wells of a crystal growth plate, by obliquely inserting the cryoloop into liquid in a well to encircle a selected crystal. The crystal is trapped in the cryoloop by surface tension, whereupon the cryoloop and liquid drop containing the crystal are withdrawn from liquid in a well.

The micro-manipulator machine for harvesting and cryofreezing crystals according to the present invention includes a rotary actuator mechanism for orbitally moving the tool head support arm and rotating the arm about its longitudinal axis to thus pivot the transverse output leg of the tool head and attached cryopin to various orbital angles relative to the tool head support arm, thus adjusting the vertical inclination angle of the cryoloop relative to a crystal growth well. The rotary actuator mechanism includes a rotary stepper motor coupled through a C-shaped yoke crank to a rear, inner end of the tool head support arm at a location behind the front panel of the machine and within an enclosure, rotation of the crank causing orbital motion of the tool arm.

The micro-manipulator machine according to the invention also includes a rotatable cryoloop inclination-angle control knob mechanically coupled to a shaft-angle encoder, which is in turn coupled electrically through machine control electronics to the tool support arm stepper motor. In a preferred embodiment, the cryoloop inclination-angle control knob and shaft-angle encoder are mounted on a front, outer end of the input control arm, near the position control knob.

According to the invention, the machine control electronics is configured to enable remote adjustment of the cryoloop inclination angle to a desired value, and includes a cryoloop Tool Angle Save control switch located on the front panel of the machine for storing that value. This arrangement enables an operator to rotate the cryoloop angle control knob to thus remotely adjust the inclination angle of the tool head and a cryoloop held in the tool head, relative to the upper horizontal surface of the work platform, which protrudes horizontally forward from a lower front portion of the machine.

Rotational adjustment of the tool head enables the operator to adjust the inclination angle of a cryoloop held in the tool head relative to a liquid drop in a selected one of an array of crystal growth wells in the upper surface of a crystal growth plate placed on the work platform. By operating the Tool Angle Save switch on the front panel of the machine, the cryoloop inclination angle data is saved in electronic memory so that positioning the cryoloop into a downward position above the work table will automatically restore the inclination angle of the cryoloop to a preset, saved value stored in memory.

The micro-manipulator machine according to the present invention includes a tool arm support crank mechanism for semi-automatically moving the tool arm a relatively large vertical distance above the work platform after the micropositioner has been used to manipulate the tool head in precisely controllable small translational motions to thus extract a liquid drop and crystals from a well.

The tool arm support crank mechanism includes a crank having the shape of a C-shaped yoke which has a pair of parallel front and rear vertically disposed arms which depend perpendicularly outwards from a longitudinally disposed upper base bar of the yoke. The front and rear arms have located between inner facing vertical sides thereof a rectangularly-shaped space in which is located a stepper motor. The stepper motor, which is attached to the front portion of a tool head support arm support mount assembly plate, has generally a cylindrical shape and a fore-and-aft disposed armature shaft which is parallel to the base bar of the crank yoke.

The rotatable shaft of the stepper motor is attached at the rear end thereof to the outer, lower end of the rear crank yoke arm. The rear end of the tool head support arm has a rearwardly extending coaxial shaft extension which is rotatably supported by front and rear longitudinally aligned bearings in the longitudinally disposed upper base bar of the crank yoke.

The tool head support arm has mounted coaxially thereon a cam wheel located forward of the front crank yoke arm. The front transverse leg of the tool head and cryoloop mounted therein are resiliently biased to be held in parallel alignment with the front and rear yoke arms by a cam follower button which is mounted to the front yoke arm and urged into a depression in the cam wheel by a leaf spring attached to the front yoke arm.

The tool arm cam and spring arrangement maintains the front transverse leg of the tool head and a cryoloop held in the tool head in parallel alignment with front and rear transversely disposed legs of the crank yoke. Thus, the cryoloop inclination angle is controlled by the rotational angle of the stepper motor armature shaft but is rotatable with respect to the yoke arm to enable the tool head and cryoloop to be pivoted momentarily towards a cryofreezer station, to thus allow cryogas to impinge on a liquid drop held in the cryoloop. The pivot mechanism which enables this action includes a transversely disposed pinion gear attached to the rear end of the shaft extension of the tool head support arm, the shaft extension being longitudinally disposed through front and rear aligned support bearings located in front and rear longitudinally aligned locations of the longitudinally disposed crank yoke base bar.

The tool head pivoting mechanism includes a convex transversely disposed sector gear which protrudes vertically upwards from the cylindrical housing of the stepper motor. The sector gear has longitudinally disposed teeth and grooves located on a circular arc segment, and is vertically centered on a longitudinally disposed vertical center plane of the stepper motor housing. The teeth of the sector gear, which has an arc length of about 20 degrees, are transversely aligned with the teeth of the pinion gear attached to the rear shaft extension of the tool head support arm.

The tool head orbiting and pivoting mechanisms of the rotary actuator mechanism function as follows.

After the micro manipulator mechanism has been used to withdraw a liquid drop from a crystal growth well by precise, small translational motions of the tool head in response to motions of the manually operated micropositioner position control knob, the operator manipulates the micropositioner position control knob to thus move the cryoloop a larger, vertical distance above the work platform. At a predetermined vertical distance, an electro-optical sensor attached to the miropositioner follower mechanism is actuated and sends a signal to control electronics. In response to this signal, the control electronic outputs a drive signal to the stepper motor. The stepper motor then rotates the yoke crank through a predetermined counterclockwise angle sufficient for the tool head and cryoloop to be orbited counterclockwise from a lower right-hand, harvesting location to an upper left docking location. Orbital motion of the yoke crank also causes the tool head and cryoloop to be repositioned from a downwardly angled orientation to a vertically upward orientation.

The operator then manipulates the position control knob to move the tool arm a further short distance upwardly and to the left, and then downwards until a perceptible physical contact is made between a docking arm protruding obliquely from the tool arm support assembly and an electrical switch located on the docking station fixedly attached to a stationary support plate of the machine.

Actuation of the docking station switch causes the control electronics to send a signal of a predetermined, selectable time duration to the stepper motor. That signal causes the stepper motor shaft to rotate a small additional counterclockwise angular increment, i.e., about 20 degrees, causing the pinion and sector gears to mesh, and thereby causing the tool head to tilt or pivot about 20 degrees counterclockwise. This action in turn causes a cam follower roller mounted on the tool head arm at the outer radial end of a bracket located rearward of the front transverse leg of the tool head to push leftwards against a cam bar protruding from the right side of a pivotable cryogas shield shutter. This motion in turn causes the cryofreeze shutter to pivot away from a position obstructing flow of cryogas for a predetermined period, thus enabling flow of cryogas onto the cryoloop and liquid drop for the predetermined time period. At the end of the time period, the stepper motor shaft is rotated 20 degrees clockwise to its previous position, in which the tool head and cryoloop are vertically upwardly oriented. Clockwise motion of the tool head enables the cryofreeze shutter to return to a rest position in which flow of cryogenic gas is blocked. In the upright vertical position, the cryopin and cryoloop may be removed by the operator and placed in cryostorage.

The micro-manipulator machine according to the present invention includes a stereoscopic microscope which protrudes from an upper front part of the machine, the microscope having a pair of objective lenses which are positionable at adjustable distances above the center of the work platform. By viewing a crystal growth plate through the stereo microscope, a human operator may manipulate the position control knob to thus remotely position a cryoloop above a selected crystal growth well in the upper surface of the plate, move the tool head downwards to thus insert the cryoloop at a selected inclination angle into a liquid drop containing crystals located in the well, and retract the tool head upwards to thus withdraw a crystal-containing liquid drop adhered to the loop by surface tension from the well.

In a preferred embodiment of the invention, the work platform has a flat upper surface which has a centrally located light-transmissive window below which is located an adjustable intensity light source. Also, the platform preferably includes a jack mechanism that enables the height of the platform to be adjusted relative to a base plate of the machine supported by a laboratory bench or table top on which the machine is placed. This arrangement facilitates viewing and manipulating crystals in drops located in the wells of transparent crystal growth plates of various heights.

The micro-manipulator machine according to the present invention also includes a cryofreezer apparatus for cryofreezing en masse a cryoloop and crystal-containing liquid drop, to thereby preserve crystals for subsequent crystallographic analysis, as will now be described.

According to the invention, the micro-manipulator machine is provided with a cryofreezer station located above and offset to the left of the center of the work platform. The cryofreezer station includes a hollow cryogas supply tube which is located above the left side of the work platform, and protrudes to the right. A continuously flowing supply of a cryogenic gas such as cold nitrogen gas evaporated from a tank of liquid nitrogen is conveyed through the cryogas supply tube from a cryogas supply apparatus.

The cryofreezer station includes a shutter mechanism that has a generally vertically disposed shutter or shield plate attached to the right-hand end of a shutter arm, which is pivotably mounted to the transversely disposed, vertical outer face of the shutter arm. The shield plate includes a vertically disposed shutter blade mounted perpendicularly to the laterally inwardly located right-hand end of the shutter arm, which is biased by the weight of a portion of the arm located to the left of the pivot axis of the arm, to a horizontally disposed orientation. In that position, the shield plate obstructs lateral flow of cryogenic gas.

The shutter mechanism according to the invention includes a curved cam bar which protrudes rightward from the shutter plate. In response to a counterclockwise pivotal motion of about 20 degrees of the cryoloop support tool head, the tool head cam follower roller pushes against the cam bar, thus causing the cryofreezer shutter arm to rotate a corresponding angular increment in an opposite, clockwise sense. Pivotal rotation of the shutter plate causes it to move downwards from an upper position in which a stream of cold nitrogen gas is obstructed from flowing to the right, to a lower position which allows a stream of cold nitrogen gas to contact the cryoloop, which is tilted about 2 degrees counterclockwise into the stream, thus freezing the cryoloop, liquid drop and a crystal contained therein.

According to the invention, the cryoloop support tool head remains tilted to expose the cryoloop to the flowing cryogenic gas for an operator-preselected period of time, e.g., 0.2 second to 4 seconds or longer if required, sufficient to freeze the liquid drop, crystal and cryoloop en masse.

The micro-manipulator machine according to the present invention is so constructed as to facilitate semi-automatic operation of the cryofreezer mechanism. Thus, the machine includes a switch located at a docking site of the tool holder support arm, which outputs a signal to the control electronics, which in turn outputs a 2-degree tilt command signal to the rotary actuator of the tool head support arm.

The docking site switch, which is attached to a docking station fixed to the machine support structure located behind the front control panel of the machine, is actuated by contact with a docking arm which protrudes obliquely from the tool support arm, when the arm has been moved upwardly, to the left, and down slightly.

When the tool head support arm has been moved upwards from the work platform sufficiently to withdraw a cryoloop and liquid drop from a crystal growth well a predetermined distance, a tool arm height sensor outputs a signal to the control electronics which outputs a command signal to the tool head rotary actuator mechanism to orbit the tool head to an upper left location, at which location the tool head and cryoloop are vertically upwardly oriented. Then, when the input control arm is manipulated to thus move the tool support arm a small distance upwards and to the left, to thus position the cryopin and cryoloop adjacent to the shutter cam bar, a slight downward motion of the position control knob causes the docking arm to move downwards and thus contact the docking site switch. Contact of the docking arm with the docking site switch produces a command signal to the stepper motor driver of the rotary head actuator to tilt the tool head counterclockwise, pivoting the cryofreezer shutter clockwise to an unblocking position enabling flow of cryogenic gas to thus expose the cryoloop to flowing cryogenic gas for an operator-preselected time interval, as described above.

After expiration of the preselected time interval, the rotary actuator automatically pivots the tool head clockwise back to an upright vertical position, enabling the cryofreeze shutter to pivot counterclockwise to an orientation in which the cryofreeze shutter blocks flow of cryogenic gas. At this position, the cryopin, cryoloop and frozen liquid drop and crystal may be manually removed from the tool head, and placed in a cryogenic storage container. A new cryopin and cryoloop may then be inserted into the cryopin support cap, to enable harvesting new crystals.

BRIEF DESCRIPTION OF THE DRAWINGS

FIG. 7 is a front perspective view of the machine of FIG. 1, showing a tool arm and tool head thereof moved to an upper, upright location to enable placement of a crystal growth plate on a work platform of the machine, and enable installation of a cryoloop in the tool head.

FIG. 16 is a fragmentary right-side elevation view of the machine of FIG. 1, showing the micro-manipulator control arm and follower thereof in a lower-most, right-most dispositions, and showing in phantom upward triggering dispositions, of the control arm and follower.

FIG. 16A is a view similar to that of FIG. 16, but showing tool arm components of the machine removed for clarity.

FIG. 17 is an upper plan view of the arrangement of FIG. 16.

FIG. 17A is a view similar to that of FIG. 17, but showing tool arm components of the machine removed for clarity.

FIG. 18 is a view similar to that of FIG. 16, but showing the control arm and follower in an uppermost and leftward disposition.

FIG. 18A is a view similar to that of FIG. 18, but showing tool arm components of the machine removed for clarity.

FIG. 19 is an upper plan view of the arrangement of FIG. 18.

FIG. 19A is a view similar to that of FIG. 19, but showing tool arm components of the machine removed for clarity.

FIG. 20A is a fragmentary view of the machine of FIG. 1, partly in longitudinal section, showing a tool head support arm and tool head thereof orbited downwards and rightwards to position a cryoloop held in the tool head is proximity to a work platform of the machine, in a crystal harvesting position.

FIG. 20B is a fragmentary front elevation view of the arrangement of FIG. 20A, showing a tool angle biasing cam and follower spring thereof.

FIG. 21A is a view similar to that of FIG. 20A, but showing the tool head support arm and tool head oriented to an upper left position.

FIG. 21B is a fragmentary front elevation view of the arrangement of FIG. 20A, showing the disposition of the tool angle biasing cam and follower spring rotated counterclockwise as viewed from the front of the machine.

FIG. 22 is a fragmentary sectional view of the tool arm support head and tool head, and cryoloop pin of the machine of FIG. 1, showing an optional vacuum tube accessory thereof.

FIG. 23 is a fragmentary right side perspective view of the machine of FIG. 1, with the tool arm and tool head thereof oriented in and positioned at a lower, crystal harvesting location, as shown in FIG. 10.

DESCRIPTION OF THE PREFERRED EMBODIMENTS

Figure 1:
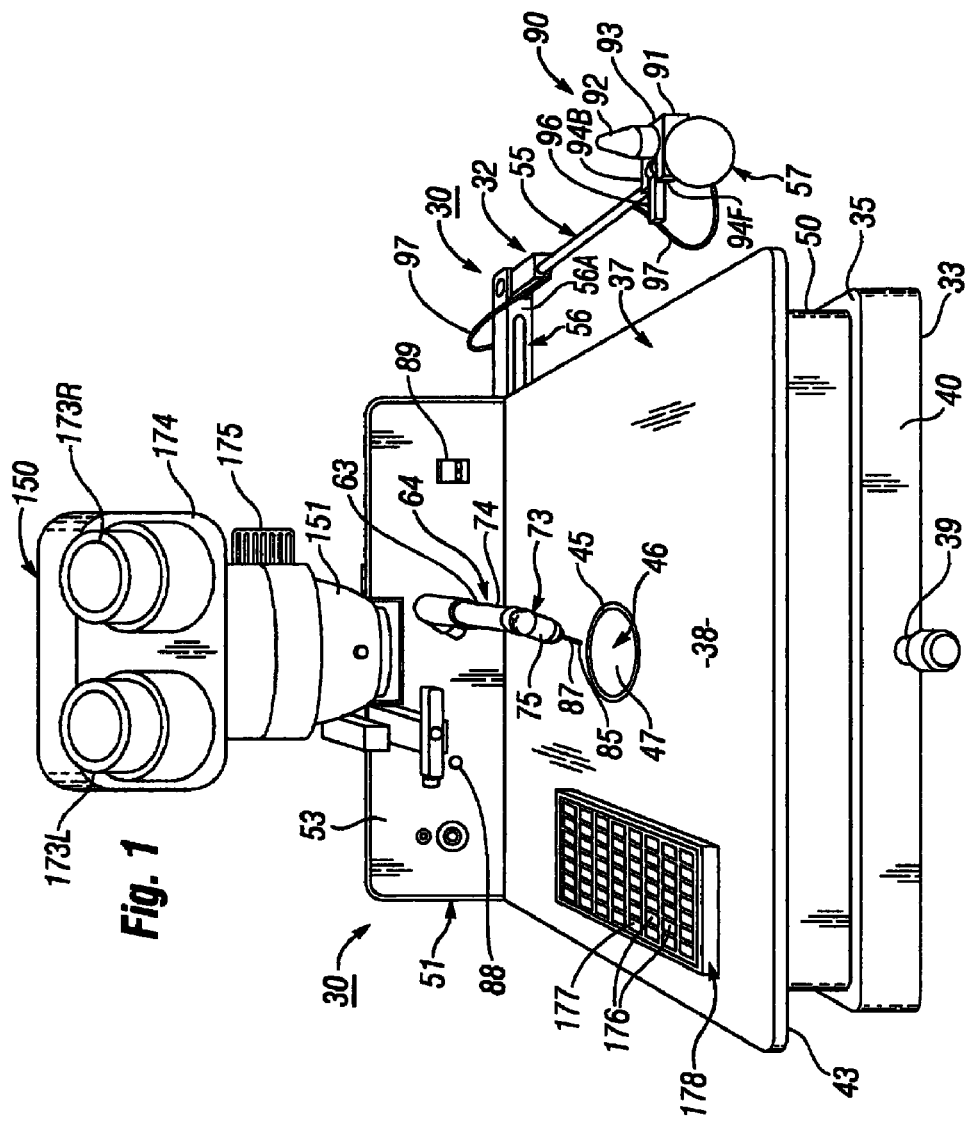
FIG. 1 is a front perspective view of a micro-manipulator machine for harvesting and cryofreezing crystals according to the present invention, showing an enclosure cover panel thereof removed.

FIGS. 1-27 illustrate various aspects of the structure and functions of a micro-manipulator machine for harvesting and cryofreezing crystals according to the present invention. The machine according to the present invention includes a micropositioner apparatus manually operable by a human operator to precisely position a remotely located tool head holding a cryoloop used for crystal harvesting.

The micropositioner apparatus includes an input control arm which protrudes forward from the right side of the machine, and which is terminated at an outer, front end of the control arm by a hand-graspable position control knob.

The micropositioner apparatus contains a mechanical linkage mechanism which causes a tool head holding a cryoloop to move translationally in orthogonal directions in a three-dimensional work space located above a work platform in precise fractional ratios of movements of the position control knob in a remotely located command input control space. The micropositioner thus enables a cryoloop mounted in the tool head to be remotely manipulated to thus insert the cryoloop into a selected one of a plurality of small crystal growth wells in a crystal growth plate supported on the work platform, retract the cryoloop from the well with a liquid drop containing a selected crystal, and move the cryoloop upwardly and to the left to a docking station and cryofreezer station comprising part of the machine.

A suitable micropositioner apparatus for use in the machine of the present invention is a modification of the "Micropositioner For Ultrasonic Bonding" described in U.S. Pat. No. 5,871,126. The entire disclosure of that patent is hereby incorporated by reference into the present disclosure.

Referring first to FIGS. 1-5, it may be seen that a micromanipulator machine 30 for harvesting and cryofreezing crystals includes a laterally elongated, rectangular rear base plate 31 which supports a micropositioner 32 and other components of the machine. The machine 30 includes a front rectangular base plate 33 of a size and shape similar to that of rear base plate 31. The front base plate protrudes forward from a front vertical wall 34 of the rear base plate, and has a horizontal upper surface 35 parallel to upper surface 36 of the rear base plate.

Machine 30 includes a work platform 37 which has a size and outline shape similar to that of front base plate 33. Work platform 37 has a flat, horizontal upper work surface 38 which overlies upper surface 35 of front base plate 33, at a height controllable by a height adjustment knob 39, which protrudes forward from front edge wall 40 of the front base plate. The height adjustment knob 39 is coupled through a shaft (not shown) to a work platform elevator jack (not shown) located between the lower surface 43 of the work platform and the upper surface 35 of the front base plate.

Figure 2:
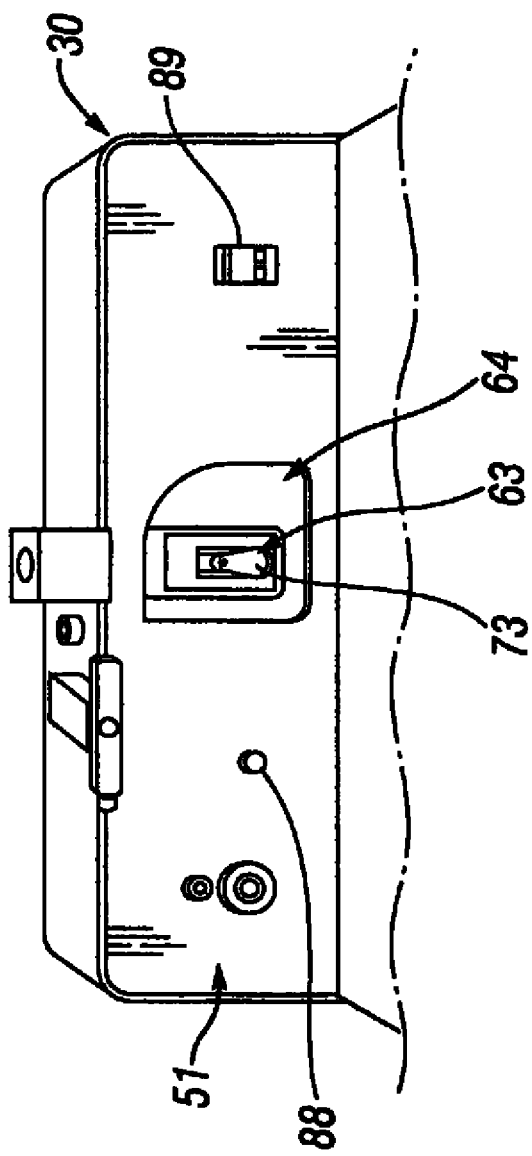
FIG. 2 is a fragmentary front elevation view of the machine of FIG. 1, showing a stereo-microscope thereof removed.

As shown in FIGS. 1 and 2, work platform 37 of machine 30 has located in a central circular aperture 45 through its thickness dimension a circular light-transmissive diffuser window 46, an upper flat surface 47 of which is flush with upper surface 38 of the work platform. Machine 30 includes a light source 48 below window 46 which is connected to an electrical power source through an intensity control rheostat 49 mounted on a right vertical side plate 50 of work platform 37.

Figure 3:
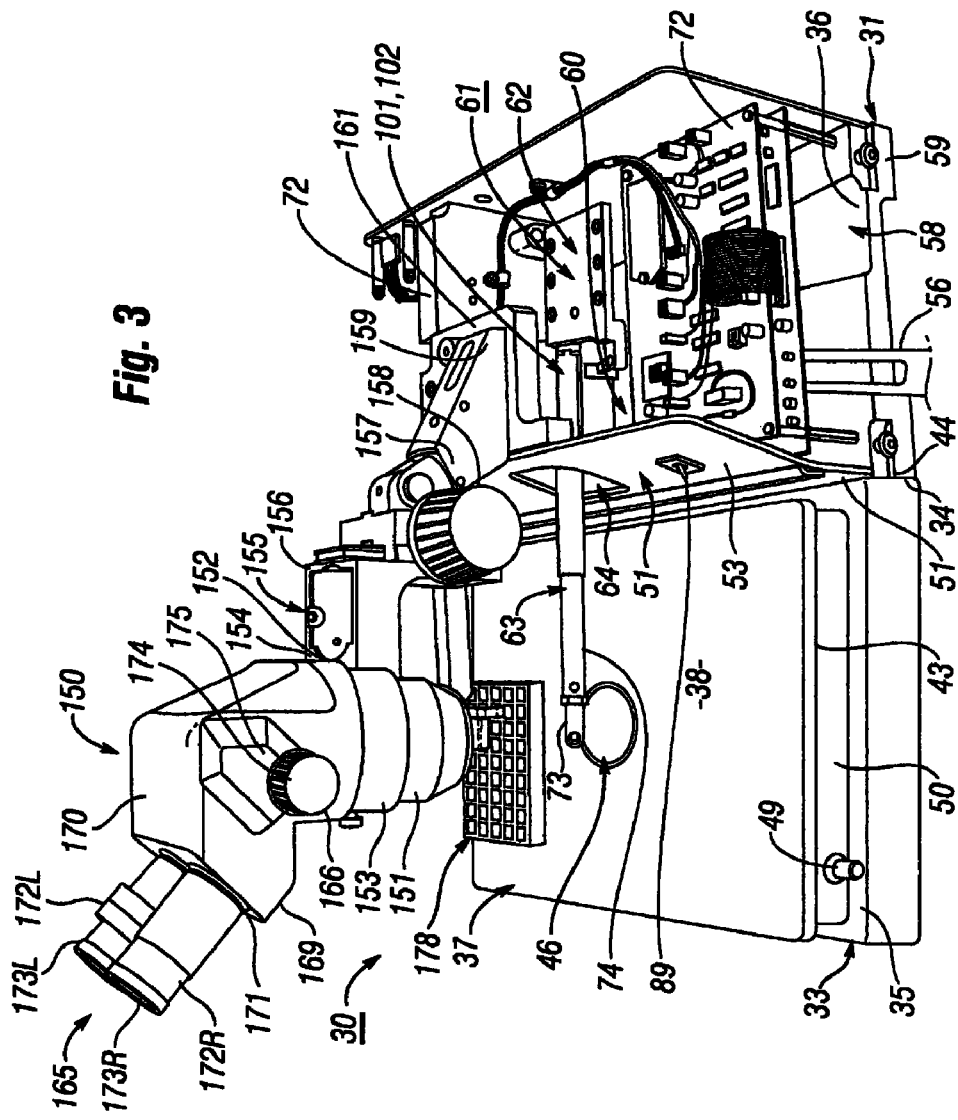
FIG. 3 is a right-hand upper perspective view of the machine of FIG. 1, showing an upper enclosure cover panel thereof removed.

Referring still to FIGS. 1-6, it may be seen that machine 30 includes a laterally elongated, rectangular front control panel 51 which extends perpendicularly upwards from a junction plane between rear vertical edge wall 44 of front base plate 33 and the front vertical edge wall of rear base plate 31. As shown in FIG. 3, front control panel 51 has a short vertical lower base portion 52 and a longer, rearwardly angled upper portion 53.

As shown in FIGS. 1-5, micropositioner apparatus 32 includes a generally horizontally disposed input control arm 55 which protrudes forward from an outer, right-hand end of a generally laterally disposed straight beam component 56A of a parallelogram linkage bar assembly 56 of the micropositioner apparatus. As shown in the figures, lateral beam 56A has a rectangular cross-sectional shape, and a skeletonized construction.

The parallelogram linkage bar assembly 56, which is also generally horizontally disposed, protrudes laterally outwardly towards the right from an opening 58 in a right-side of machine 30, above rear base plate 31. Thus, input control arm 55 is disposed in a generally fore-and-aft direction in a horizontal plane, offset to the right of right-hand side wall 59 of machine 30. As shown in the figures, input control arm 55 has the shape of a long straight shaft which is terminated at a front, free end thereof by an axially mounted, spherically-shaped position control knob 57.

Figure 4:
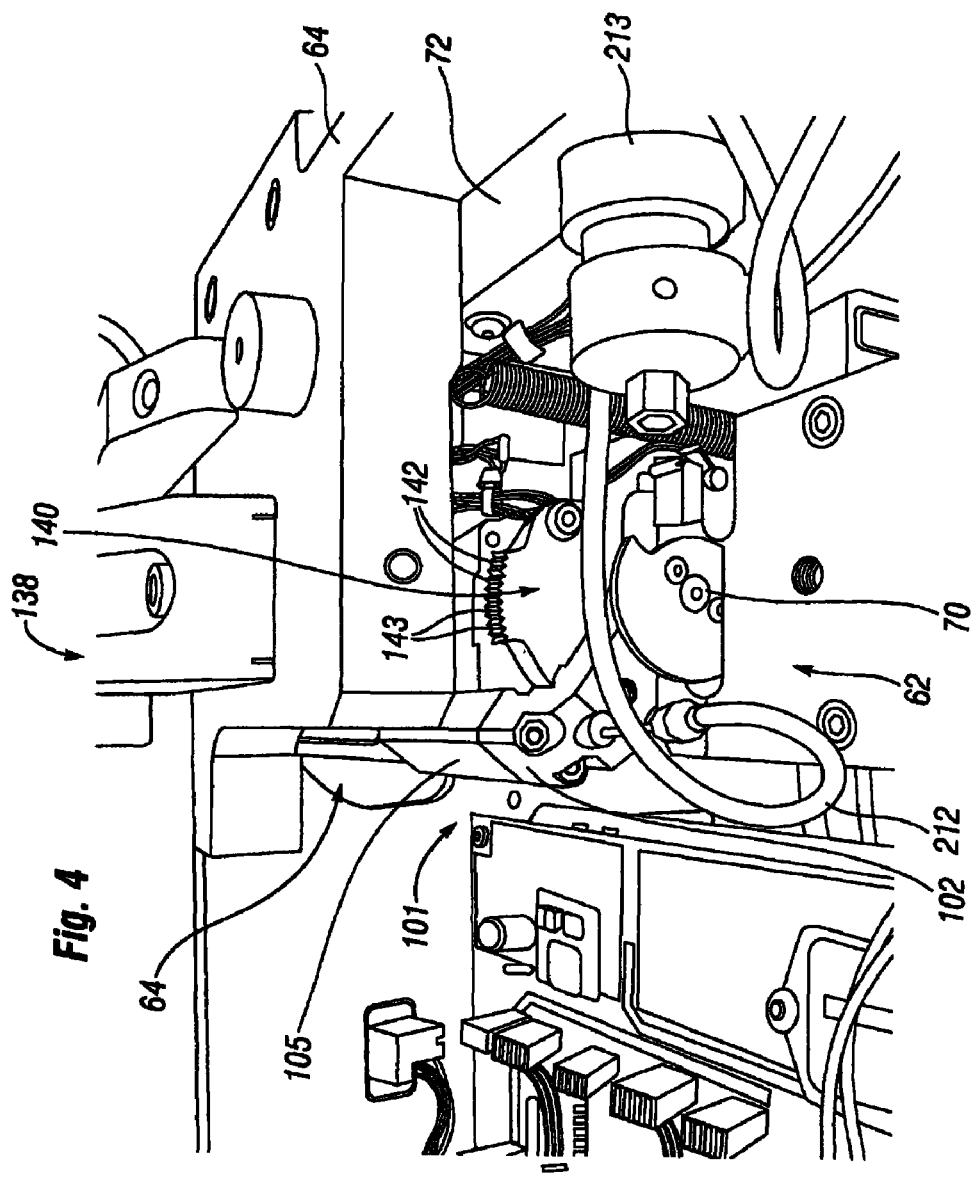
FIG. 4 is a fragmentary rear perspective view of the machine of FIG. 1.
Figure 5:
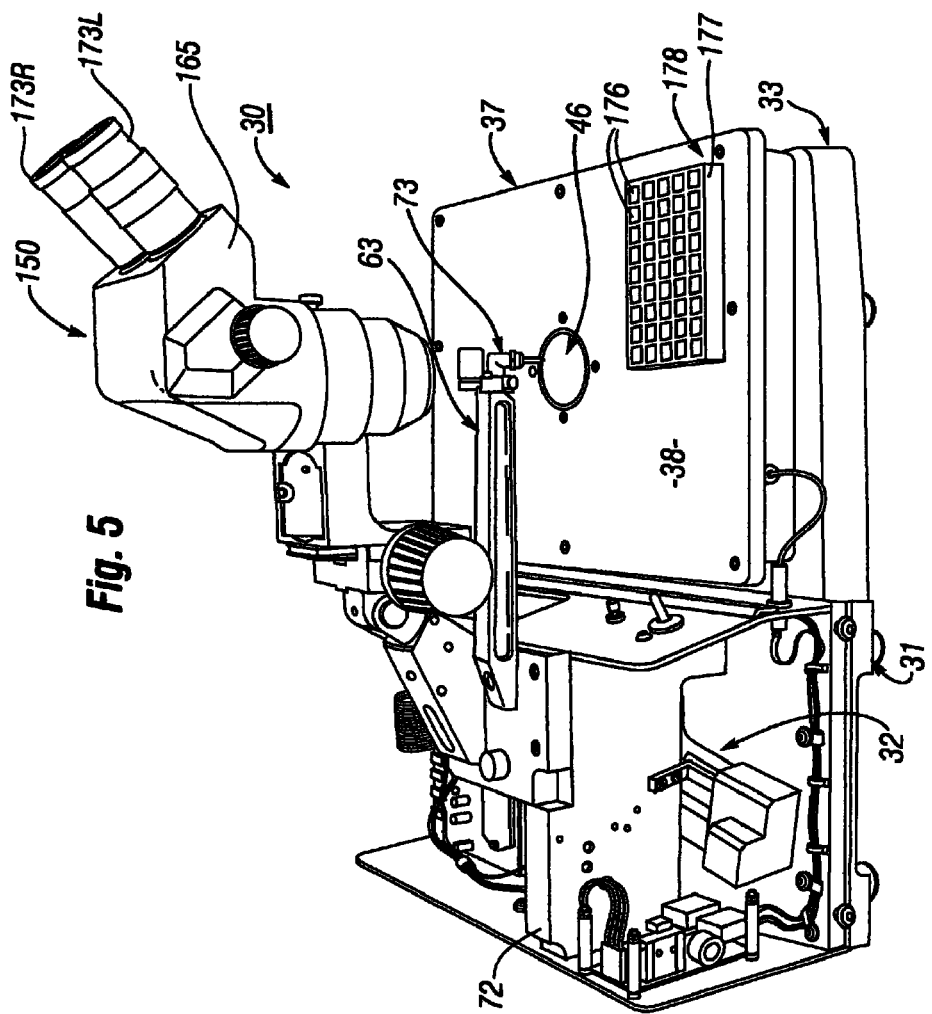
FIG. 5 is a left-hand upper perspective view of the machine of FIG. 1.

Referring to FIGS. 3, 4 and 17A, it may be seen that an inner, output end 60 of lateral beam 56A parallelogram bar linkage assembly 56 of micropositioner apparatus 32 is pivotably coupled through a follower mechanism 61, tool head support arm support plate 62 and orbital actuator mechanism 101 including a yoke crank 102 to an elongated, straight, generally horizontally disposed tool head support arm 63 which protrudes forward through a rectangularly-shaped tool-head support arm clearance aperture 64 that is laterally centrally located in upper part 53 of front control panel 51.

Thus, tool head support arm 63 is disposed in a generally fore-and-aft direction, above and parallel to upper surface 38 of work platform 37, and parallel to input control arm 55.

As shown in FIGS. 16A-19A, a laterally inwardly located end 60 of micropositioner lateral beam 86 is pivotably supported by the right-hand face of a vertical support plate 72, which protrudes upwardly from rear machine base plate 31.

As may be seen best by referring to FIGS. 20A and 20B, tool head support arm 63 has disposed axially rearward therefrom an elongated, straight tool head support arm shaft extension 66. The support shaft extension 66 has fastened coaxially to a rear end portion thereof a pinion gear 67, the function of which will be described below. As will be described in detail below, yoke crank 102 is rigidly coupled to the output shaft 70 of a stepper motor 71. In response to electrical drive signals received from a control electronics module 72, stepper motor 71 incrementally rotates crank yoke 102 and tool head support arm 63.

As shown in FIGS. 1-6, and 22, tool head support arm 63 has fastened to a front, outer end thereof an L-shaped tool head 73. Tool head 73 has a short, straight, rear longitudinally disposed leg 74 which is axially aligned with and fastened to a front, outer end of tool head support arm 63. Tool head 73 also has a short, straight front transversely disposed leg 75 which depends perpendicularly from the front end of rear leg 74, i.e., in a radial direction relative to tool head support shaft 66. Thus, front leg 75 is disposed generally in a vertical plane, and is pivotable in that plane by rotation of tool head support arm 63.

As shown in FIGS. 7, 8, 22 and 25, the front radially disposed leg 75 of tool head 73 has located in a transversely disposed outer end face 76 thereof a coaxially centrally located, blind socket 77 for removably holding by magnetic force provided by a magnet 78 (not shown) a cylindrically-shaped cryoloop support cap 79. The cryoloop support cap 79 has disposed axially inwardly from an outer frusto-conically-shaped transverse face 80 thereof a central coaxial bore 81. Bore 81 is provided for receiving the inner end portion of the shank 82 of straight cryoloop pin 83. Cryoloop pin 83 has protruding from an outer transverse end 84 thereof a small, planar cryoloop 85.

Cryoloop 85 consists of a thin filament of nylon, Kapton or other polymer, which is formed into a longitudinally elongated oval-shaped planar loop, opposite ends of the filament being arranged in a parallel, twisted configuration and inserted into a coaxial bore 86 extending longitudinally inwards into outer transverse face 84 of cryopin 83. The filament diameter of a typical cryoloop 85 is about 10 microns, while the loop diameters range from about 0.05 mm to about 1.0 mm.

In an example embodiment of machine 30 that was tested by the present inventor, the cryoloop support cap 79, cryoloop pin 83 and cryoloop 85 were obtained from the Hampton Research Corporation, 34 Journey, Aliso Viejo, Calif. 92656-3317. In the example embodiment, a pickup tool 87 consisting of Hampton Research Catalog No. HR4-747 cryoloop support cap 79 to which is permanently attached a threaded and bonded, solid 3 mm diameter copper cryoloop pin 83 was used. Bore 86 of cryoloop pin 83 had a diameter of about 0.65 mm, and was adapted to insertably receive a Cat. No. HR4-981 cryoloop 85. As will be described below, the pickup tool 87 is used to harvest crystals by inserting the cryoloop 85 at the end of the fool into a well containing a liquid drop and crystals.

As shown in FIGS. 1-7, machine 30 includes a tool head angle control mechanism 90 for remotely adjusting the axial rotation angle of tool head support arm 63, and hence the vertical inclination angle of a cryoloop 85 held parallel to front transverse leg 75 of tool head 73. The tool head cryoloop vertical inclination angle control mechanism 90 includes an electrical shaft angle encoder 91 which has protruding therefrom a shaft terminated at an upper end thereof by a, conically-shaped control knob 92. The encoder 91 is mounted on an encoder support block 93, the latter being longitudinally slidably mounted on micropositioner input control arm 55.

As shown in the figures, shaft angle encoder support block 93 has a bifurcated clevis-like shape which includes front and rear laterally outwardly protruding front and rear arms 94F, 94B, which have therethrough front and rear longitudinally aligned bores 95F, 95B that are slidably mounted on control arm shaft 55. A toggle clamp bar 96 located between front and rear arms 94F, 95B enables encoder support block 93 to be slid rearward of front micropositioner position control knob 57 to a desired position by a human operator, and locked in that position by pivoting toggle clamp bar 96 downwards.

Figure 6:
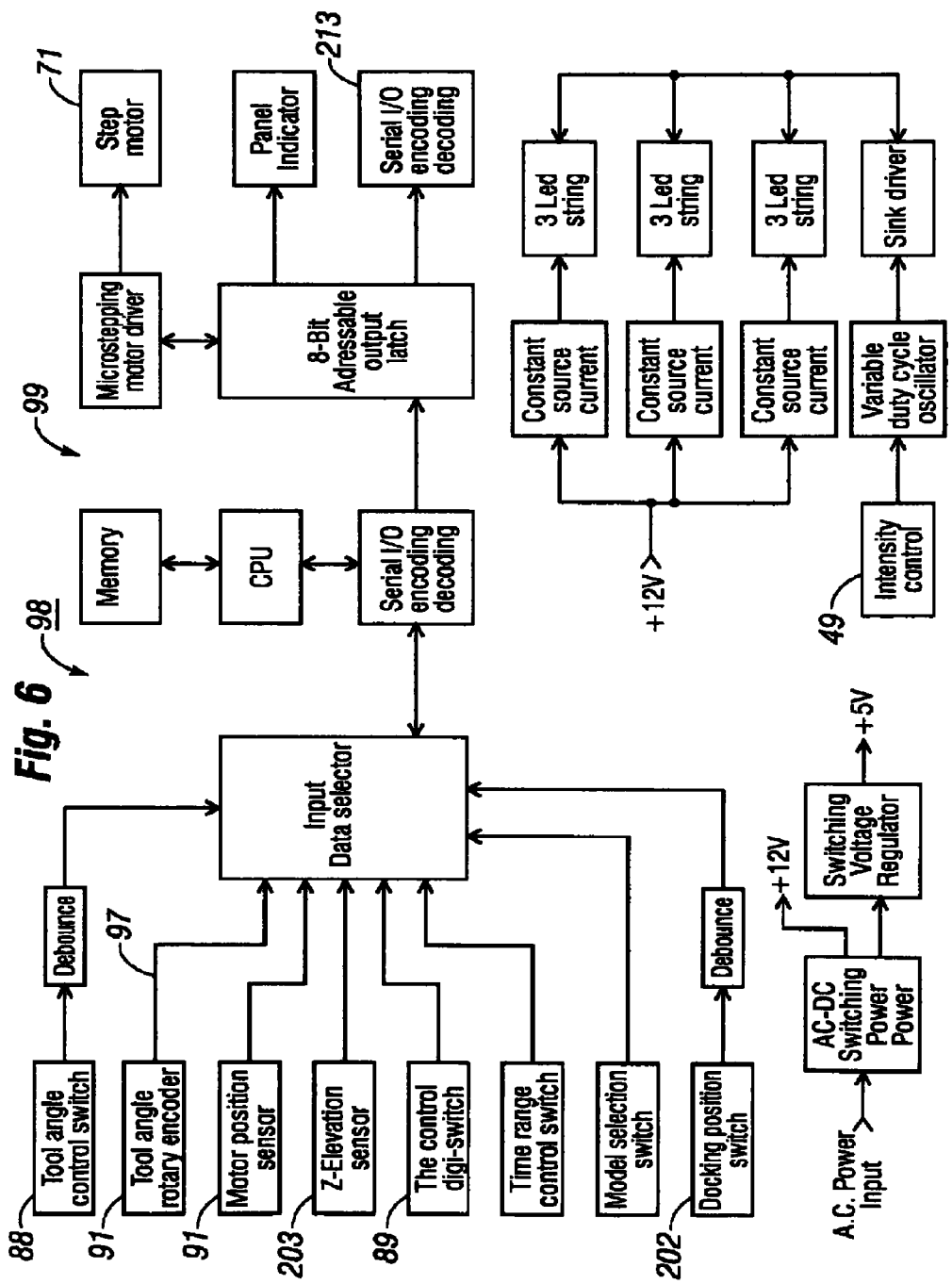
FIG. 6 is an electrical block diagram of the machine of FIG. 1.
Figure 8A:
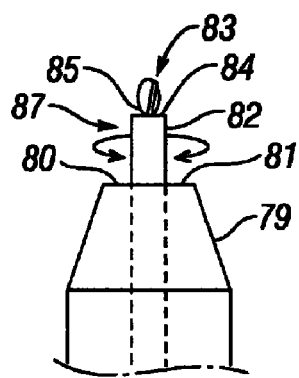
FIG. 8 is a fragmentary, partly diagrammatic front perspective view of the machine of FIG. 1, showing the manner of installing and orienting a cryoloop pin and support cap in the tool head of the machine.

In response to manual twisting of tool angle encoder knob 92, shaft angle encoder 91 outputs an electrical signal through a flexible electrical cable 97 to control electronics module 98. As shown in FIG. 6, control electronics module 98 contains circuitry 99 which outputs stepper motor drive signals to tool head support shaft stepper motor 71, which are effective in orbiting tool head support arm 63 and tool head 73 to selected rotation angles and thereby orient the tool head and cryoloop to selected vertical inclination angles.

As shown in FIGS. 1 and 7, machine 30 includes a Tool Angle Save switch 88 mounted on font control panel 51 of the machine, and a Cryofreeze Time Duration digiswitch 89 also mounted on the front control panel. Both switches are electrically connected to control circuitry 99 in control electronics module 98, the functional operations which will be described below.

Referring to FIGS. 4, 20A, 21A and 24, it may be seen that micro manipulator machine 30 includes a tool arm support crank mechanism 101 for semi-automatically orbitally moving the tool arm. Crank mechanism 101 is effective in orbitally moving the tool head 73 and cryoloop 85 from a downwardly inclined, crystal harvesting location as shown in FIG. 1, to a docking site location above and to the left of the center of the machine, as shown in FIG. 25.

As shown in FIGS. 4, 20A, 21A and 24, tool arm support crank mechanism 101 includes a crank 102 having the shape of a C-shaped clevis or yoke which has front and rear vertically disposed parallel arms 103, 104, which depend perpendicularly from a longitudinally disposed base bar 105 of the yoke. The front and rear yoke arms 103, 104 have located between inner facing vertical sides 106, 107 thereof a rectangularly-shaped space 108 in which is located a stepper motor 71. Stepper motor 71 is attached to the upper surface 110 of tool head arm support mount assembly plate 62, near a front transverse end 112 of the plate. Stepper motor 71 has a generally cylindrically-shaped housing 113 and a longitudinally disposed armature shaft 70 which is disposed parallel to base bar 105 of crank 102.

Shaft 70 of stepper motor 71 is connected a rear end 115 thereof to the inner, upper end 116 of rear yoke arm 104 of crank yoke 102. The rear shaft extension 66 of tool head support arm 63 is rotatably supported by front bearing 118 which extends inwards from the front surface 119 of front crank yoke upper base bar 105.

Reduced diameter rear shaft extension 66 of tool head support arm 63 is coaxially aligned with the tool arm, and protrudes axially rearwards from rear surface 121 of the tool arm. The rear end of tool arm shaft extension 66 is rotatably supported by a rear bearing 120. Tool arm shaft extension 66 has mounted coaxially at the front end 122 thereof a rotary cam wheel 123 which is adjacent to the front surface 119 of crank upper base bar 105.

Front transverse leg 75 of tool head 73 and a cryoloop 85 mounted in the leg are resiliently biased to be held in parallel alignment with the front and rear yoke arms 103, 104 by the following construction.

Figure 13:
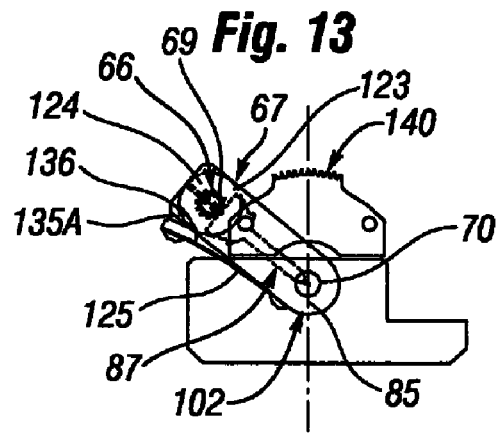
FIGS. 13-15 are fragmentary, partly diagrammatic rear perspective views of a tool arm orbital yoke crank and tool head pivot mechanism, showing the disposition of the mechanisms for the tool head orientations shown in FIGS. 10-12, respectively.
Figure 14:
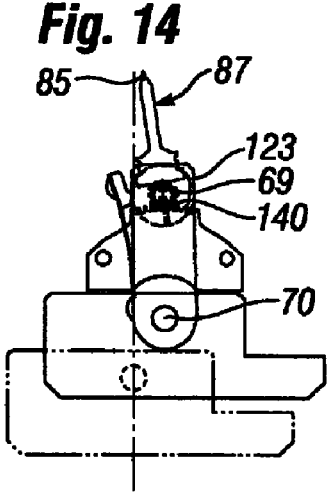
Figure 15:
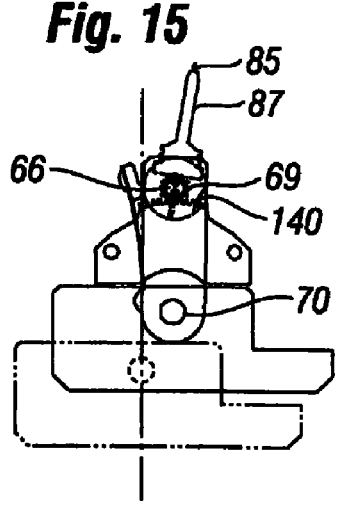

As shown in FIGS. 13 through 15 and 20A-21B, machine 30 has a cam follower 124 which includes a leaf spring 125 that is mounted on front crank yoke arm 103. Leaf spring 125 has a flat, elongated rectangular shape and is fastened at a lower end thereof to front crank yoke arm 103, near a radially outwardly located end of the arm. As shown in FIG. 13-15, leaf spring 125 has flat, parallel outer and inner surfaces 127, 128, which are disposed parallel to a fore-and-aft plane, i.e., perpendicular to front surface 103A of front yoke arm 103.

Leaf spring 125 is attached to an outer end of front yoke arm 103 by means of a rectangularly-shaped spring mounting block 129 which protrudes forward from front surface 103A of the arm, near the radially outwardly located face 130 of the arm, and a screw 131 which is disposed through hole 132 through the lower end of the leaf spring, and tightened into a threaded bore 133 which penetrates an outer face 134 of the spring mounting block.

Referring to FIGS. 13 through 15, it may be seen that leaf spring 125 has protruding laterally inwards from an upper free end thereof a rounded follower knob 126 which is urged resiliently into a concave depression 136 in the outer peripheral surface 137 of cam wheel 123.

The cam and follower spring arrangement described above resiliently biases the tool head support arm shaft angle so that the front transverse leg 75 of tool head 73, and a cryoloop held in the tool head are in alignment with the longitudinal axes of front and rear transversely disposed legs 103, 104 of crank yoke 102. Thus, the inclination angle of a cryoloop 85 held in tool head 73 may be adjusted by adjusting the orbital angle of yoke crank 102, which is in turn adjusted by the azimuth or rotation angle of armature shaft 70 of stepper motor 71. However, as will be described below, the cam and spring arrangement comprise parts of pivot mechanism 138 which enables tool head arm 63 and attached tool head 73 and cryoloop 85 to be pivoted momentarily away from parallel alignment with the front arm 103 of yoke angle 102, against biasing tension provided by spring 125. As will also be described below, pivot mechanism 138 of tool head support arm 63 enables the tool head arm and head 73 to be pivoted momentarily towards a cryofreezer station 139, to thus allow cryogas to impinge on a liquid drop held in a cryoloop.

Referring to FIGS. 4 and 13-15, it may be seen that tool head pivot mechanism 138 includes a transversely disposed sector gear 140 which protrudes vertically upwards from an outer cylindrical surface 141 of housing 142 of stepper motor 71. Sector gear 140 has longitudinally disposed teeth 142 and grooves 143 located on a circular arc segment, and is vertically centered on a longitudinally disposed center plane of the stepper motor housing. The teeth of the sector gear 140, which has an arc length of about 20 degrees, are transversely aligned with the teeth and grooves 144, 145 off pinion gear 69 attached to the rear end of tool head arm support shaft 66. As shown in FIGS. 16-22, tool head arm support shaft 66 is disposed longitudinally rearwards through front and rear longitudinal bearings 146, 147 in yoke crank base bar 106. Thus, as will be described below, when stepper motor shaft 70 is rotated counterclockwise sufficiently far for pinion gear 69 to contact the right side of sector gear 140, further counterclockwise rotation of the stepper motor shaft will cause the pinion gear and sector gear to mesh, thus causing tool arm support shaft 66 to rotate against the tension provided by cam and follower spring 123 and 125.

Referring again to FIGS. 1-5, it may be seen that machine 30 according to the present invention includes a stereoscopic microscope 150. As shown in FIGS. 1 and 3, stereoscopic microscope 150 is laterally centrally located with respect to work platform 37 of machine 30, and has a lower generally frusto conically-shaped objective lens turret 151 which is positioned in axial alignment above central light transmissive diffuser window 46 of the work platform.

Objective lens turret assembly 151 of stereoscopic microscope 150 fits vertically downwards into a cylindrical bore 152 provided through a horizontally disposed rectangular-shaped support plate 153 which forms the outer leg 154 of an inverted L-shaped microscope support bracket 155. An inner vertical leg 156 of microscope support bracket 155 is coupled through a rack-and-pinion elevator mechanism 157, adjustable in height by a hand wheel 158, to an obliquely upwardly and forwardly angled cantilever support bar 159. The latter has a flat, horizontally disposed lower surface 160 which is fastened in flat overlying contact to the flat upper surface 161 of flat, horizontally disposed microscope mounting plate 162 which protrudes rearward from a rear inner wall 163 of front control panel 53, the upper surface 161 being coplanar with the upper edge 164 of the front control panel.

Referring to FIGS. 1 and 3, it may be seen that stereoscopic microscope 150 includes an ocular head structure 165 which has a cylindrically-shaped lower housing 166 that is coaxially aligned with lower objective lens turret 151. Housing 166 has a lower, flat, annular ring-shaped shoulder flange 167 which joins the upper end of lower objective lens turret 151, which is supported by the flat upper surface 168 of support plate 153.

As shown in FIGS. 1 and 3, ocular head structure 165 of stereoscopic microscope 150 has disposed forward from an upper end of a lower cylindrically-shaped housing 166 a box-shaped eyepiece mounting assembly 169. The latter has a flat, horizontally disposed upper wall surface 170, and a flat transversely disposed front rectangularly-shaped lens mount surface 171 which is disposed parallel to but angled downwardly from the upper wall surface. A pair of left and right eyepiece holder tubes 172L, 172R protrude perpendicularly upwards from the downwardly angled front lens mount surface 171. Eyepiece holder tubes 172L, 172R hold ocular lens assemblies 173L, 173R, respectively, which are individually adjustable to compensate for differing focus distances of the left and right eyes of a human operator.

As shown in FIG. 1, stereoscope microscope 150 also includes a focus control hand wheel 174 which protrudes from a right side wall 175 of the microscope, and which is used to bring into focus an image of a cryoloop 85 and a selected well 176 in the upper surface 177 of a crystal growth plate 178 placed on light transmissive window 46 of work platform 37.

Figure 27:
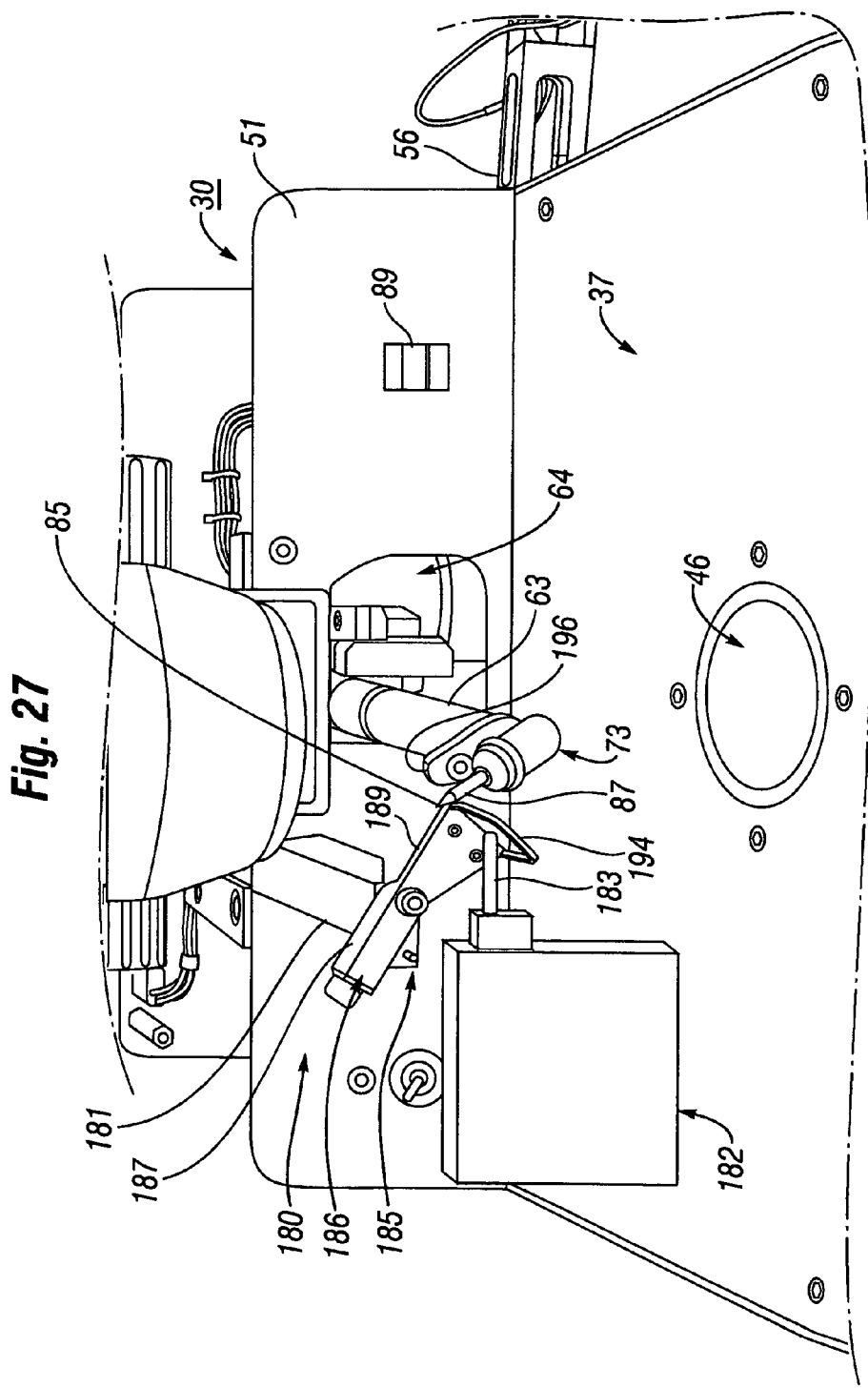
FIG. 27 is a fragmentary front perspective view of the machine of FIG. 1, showing the tool arm and tool head thereof oriented as shown in FIG. 12, showing the tool head automatically and momentarily pivoted counterclockwise to thus expose the tool head to flowing cryogas.

As shown in FIGS. 25 and 27, machine 30 includes a cryofreezer apparatus 180 for cryofreezing en masse a cryoloop and a liquid drop containing a crystal held within the cryoloop.

Referring to FIGS. 11, 12, 25, and 27, it may be seen that cryofreezer apparatus 180 includes an elongated rectangular cross section shutter support beam 181. Cryofreezer apparatus includes a source of liquid nitrogen 182 from which is boiled off cold nitrogen gas, which is input to a hollow, laterally disposed flexible cryogas supply tube 183. The latter is connected at a rear input end thereof located behind front machine control panel 51 to a source (184, not shown) of a cryogas, such as nitrogen gas evaporated from liquid nitrogen. Cryogas supply tube 183 extends from source 182, horizontally towards the right, i.e., towards a vertical center plane of work platform 37. An example of a suitable source 182 of cold nitrogen gas is the Model 700 series nitrogen gas cryostream cooler supplied by Oxford Cryosystems, 220 Wood Road, Braintree, Mass. 02184.

Cryofreezer apparatus 180 includes a shutter mechanism 185 which is attached to transverse outer face 183 of shutter support beam 181. The shutter mechanism 185 includes a shutter arm 186 that has a straight, rectangular cross section bar member 187 which is pivotally mounted to front face 181A of shutter support beam 181 by a pivot axle 188 which enables the shutter arm to pivot in a vertical plane.

Shutter mechanism 185 also includes a shutter 189 which joins a right-hand portion of shutter arm 186, and which protrudes to the right of pivot axle 188 and the right-hand side wall 190 of shutter support beam 181.

Shutter 189 includes a laterally disposed, vertical wedge-shaped support plate 191 that has a narrower inner, left-hand end part which is fastened to shutter arm 186.

Shutter 189 also includes a fore-and-aft disposed, generally vertical shield plate 192 located at the inner, right-hand edge of shutter support plate 191. As shown in FIG. 25, shutter arm 186 of shutter mechanism 186 is maintained in a horizontal position by a counterclockwise torque moment exerted around pivot axle 188 by the weight of that portion of the shutter arm located to the left of pivot axle 188. In this quiescent position, shield plate 192 located at the laterally inwardly located, right-hand end of the shutter arm is positioned in a fore-and-aft, generally vertically disposed position adjacent to the outlet orifice 193 of cryogas supply tube 183, thus obstructing rightward horizontal flow of cryogas.

As shown in FIGS. 25 and 27, shutter mechanism 185 includes a curved cam bar 194 which protrudes laterally outwards from the right side of shutter plate 192, adjacent to its rear edge. Cam bar 194, which has in front elevation view the shape of a reverse C-shape, has a convex, generally vertically disposed outer right-hand segment 195.

As may be seen best by referring to FIGS. 5, and 22, 24 and 25, tool head 73 has protruding radially from a location rearward of longitudinally disposed leg 74 thereof a cylindrically shaped cam follower roller 196 is mounted on the outer radial end of a support bracket 197 which is located behind and parallel to front transverse tool head leg 75. Cam follower roller 196 is rotatable about a fore-and-aft disposed axle 198 parallel to tool head support arm 63. Thus, when tool head 73 is positioned adjacent to cam bar 194, and rotated counterclockwise, cam follower roller 196 pushes leftwards against outer right-hand segment 195 of cam bar 194. This pushing motion causes shield plate 192 to pivot clockwise, thus allowing unobstructed flow of cryogas from cryogas tube 183 onto a cryoloop 85 held by tool head 73.

As shown in FIG. 22, tool head support arm 63 and tool head 73 preferably have a hollow construction including coaxial bores 210, 211, respectively, which are axially aligned. Optionally, bores 210, 211 have disposed therethrough a vacuum tube 212 which is connectable at a rear, inner end thereof through a solenoid valve 213 (see FIGS. 4 and 6) to a vacuum source (not shown), and at a front, outer end to a crystal pick-up implement (not shown).

FIGS. 1 and 7-27 illustrate the manner of using machine 30 to harvest crystals from wells 177 of a crystal growth plate 178, and cryofreezing the harvested crystals for cryogenic storage and subsequent crystallographic analysis, which is typically performed using an X-ray diffraction instrument.

Figure 24:
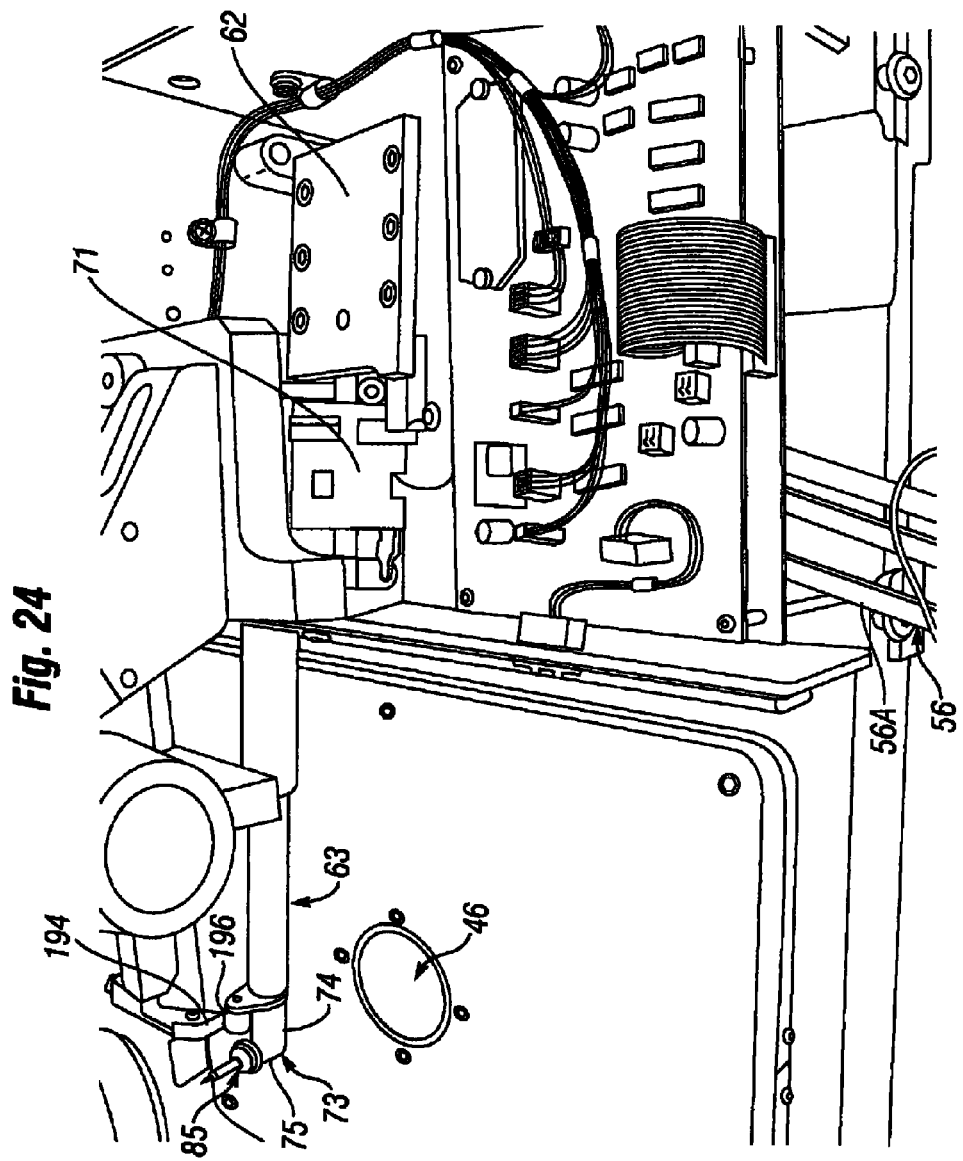
FIG. 24 is a view similar to that of FIG. 23, showing the tool arm and tool head thereof oriented and positioned at an upper, crystal retrieval position, as shown in FIG. 11.
Figure 25:
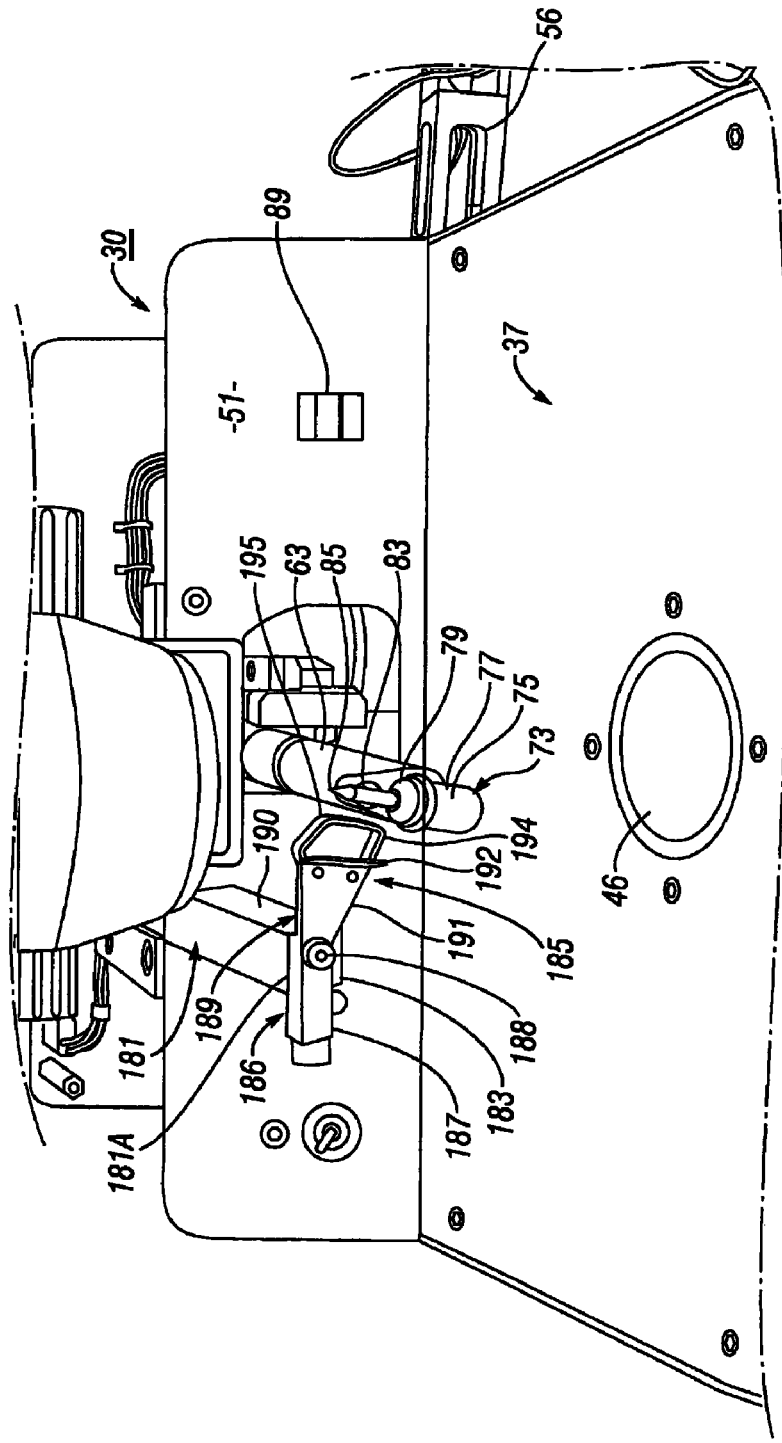
FIG. 25 is a fragmentary front perspective view of the machine of FIG. 1, showing the tool arm and tool head moved towards a docking station, corresponding to the orientation of the tool head shown in FIG. 11.
Figure 26:
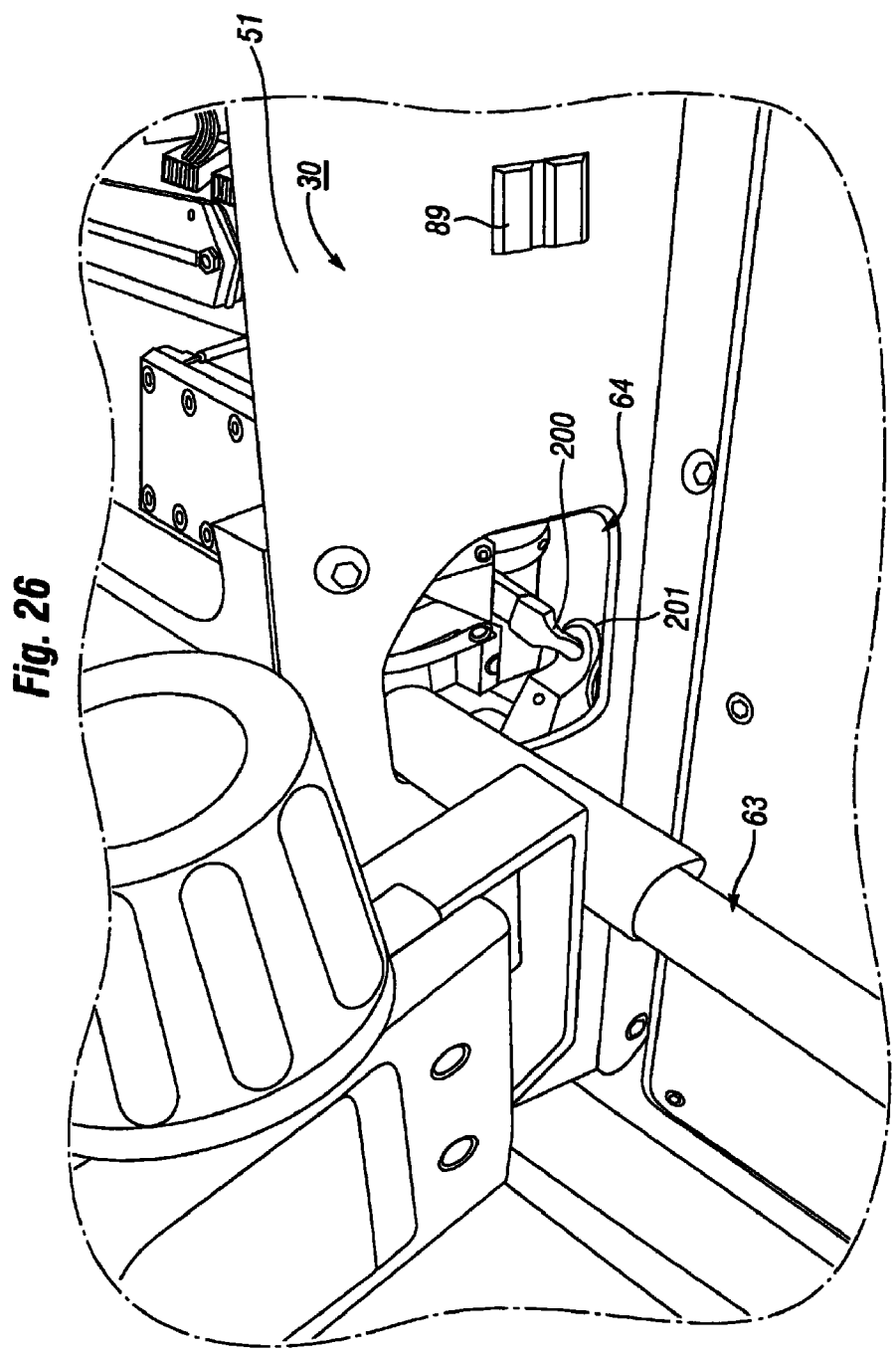
FIG. 26 is a fragmentary front perspective view of the machine of FIG. 1, on an enlarged scale and showing contact of docking arm thereof with a docking station.

As shown in FIGS. 24-26, a first step in using machine 30 to harvest and cryofreeze crystals includes manipulating position control knob 57 of micropositioner apparatus 32 in an upward direction, to thus position tool head 73 in an upper position. The position control knob 57 is then manipulated slightly to the left of center and down slightly until a docking arm 200 which protrudes forward from laterally disposed beam 56A 60 of micropositioner 32 bumps down against a docking site stationary member 201 which protrudes from vertical micropositioner support plate 72. As shown in FIGS. 17, 17A, 19 and 19A, docking arm 201 is pivotably mounted near a rear end thereof to lateral micropositioner beam 60.

Figure 9:
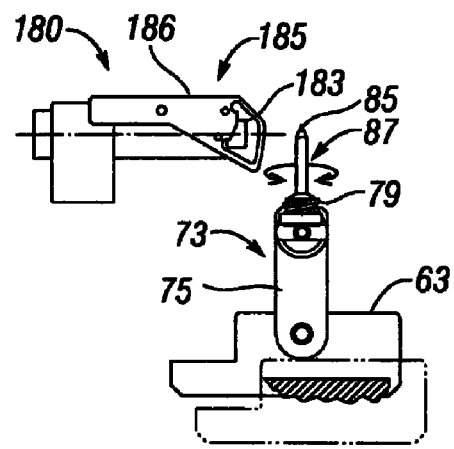
FIG. 9 is a view similar to that of FIG. 8, showing a tool head support arm and tool head of the machine moved downwards towards the work platform of the machine, preparatory to using a cryoloop installed in the tool head to extract crystals from crystal growth wells in a crystal growth plate placed on the work platform.
Figure 8B:
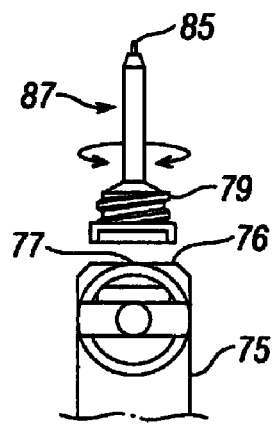
Figure 10:
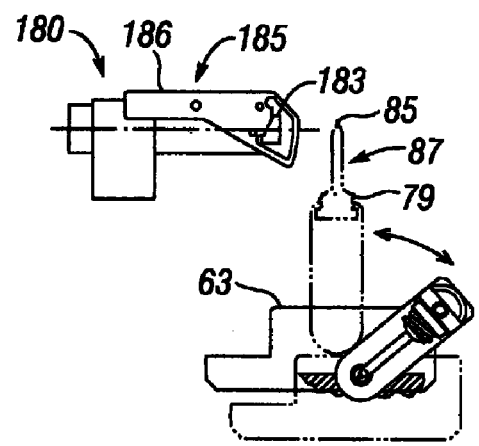
FIG. 10 is a view similar to that of FIG. 9, showing the adjustability of the vertical inclination of the tool head, preparatory to inserting the cryoloop into a selected well to harvest a liquid drop containing crystals.

Contact of docking arm 200 with docking site member 201 actuates an electrical switch 202 which provides an input signal to electronic control circuitry 99. In response to the signal from docking site switch 202, electronic control circuitry 99 outputs an electrical command signal to tool head angle stepper motor 71, which causes tool head support shaft 66 to rotate to an angular position in which outer transverse leg 75 of the tool head is oriented in an upright vertical disposition, as shown in FIG. 9. In this position, a pickup tool 87 consisting of a cryoloop support cap 79 in which are installed a cryoloop pin 83 and cryoloop 85 is inserted downwards into socket 77 in the horizontally disposed, outer transverse end face 76 of tool head leg 75. As shown in FIG. 9, cryoloop pin 83 is then manually rotated about its longitudinal axis until the plane of the cryoloop is located in a generally fore-and-aft orientation, so that the loop plane is perpendicular to a cryogas stream issuing to the right from cryogas supply tube 183.

After a cryoloop 85 has been installed in tool head 73 and oriented as described above, micropositioner position control knob 57 is manipulated by a human operator to move the tool head support arm and tool head upwards slightly to disengage or "undock" the tool arm from docking site 201. This action causes electrical switch 202 to provide an open-circuit signal to electronic control circuitry 99. Then, when the tool arm is moved downwardly a predetermined distance in response to manual operation of the position control knob 57, downward motion of the follower mechanism causes a flag 204 thereon to interrupt a light beam from a LED of a photo sensor 203 fixed to the machine support structure. In response to a signal from photo sensor 203, electronic control circuitry 99 outputs an electrical command signal to stepper motor 71 to orbitally rotate crank yoke 101 and attached tool head support arm 63, clockwise from the vertically upright central docking orientation shown in FIG. 9, to a laterally rightward and downward location, at which tool head 73 and cryoloop 85 are angled downwardly and towards the left, i.e., towards the center of the machine.

Then, as shown in FIGS. 1, 3, 5, and 23, position control knob 57 of micropositioner apparatus 32 is manipulated to move tool head 73 down towards work platform 37 and above a selected well of a plurality of wells 176 in the upper surface 177 of crystal growth plate 178 supported on the upper surface of the work platform. In this position, the human operator twists tool angle control knob 92 to pivot tool head 73 to that angular position which orients cryoloop 85 at an optimum inclination angle for harvesting a liquid drop and crystal from a crystal growth well 177. The operator may then actuate Tool Angle Save switch 101 to store the selected tool angle.

With the inclination angle of the cryoloop 85 adjusted as described above, the human operator may then view the cryoloop 85 in relation to a selected crystal growth well 176 through stereo microscope 150, and manipulate micropositioner position control knob 57 to cause the cryoloop to move obliquely downwards into the well, thus capturing a liquid drop holding a selected crystal within the cryoloop.

Figure 11:
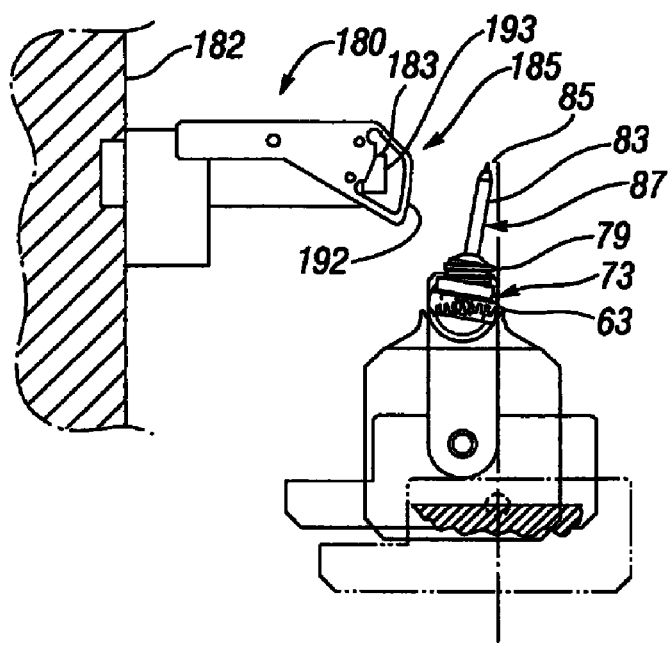
FIG. 11 is a view similar to that of FIG. 10, showing the tool arm and tool head moved upwards from the platform towards a docking station of the machine, after withdrawing a liquid drop containing crystals from a crystal growth well.
Figure 12:
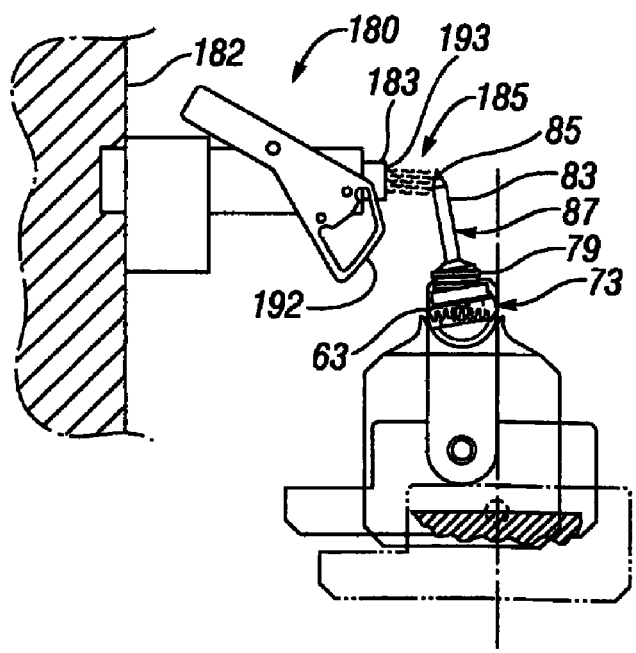
FIG. 12 is a view similar to that of FIG. 11, showing the tool head momentarily pivoted counterclockwise to thus rotate a cryoshutter clockwise and thereby enable a stream of cryogas to impinge on the liquid drop held in the cryoloop.

Position control knob 57 is then manipulated to thus move tool head support arm 63, tool head 73 and cryoloop 85 holding a liquid drop containing a crystal to an upward position. Upward motion of tool head support arm 63 a predetermined distance causes an electrical signal produced by electrical sensor 203 consisting of a flag 204 and a photo transistor-LED arrangement 205 to command stepper motor 71 to orbit support arm 63 to an upper, leftward location towards the center of the machine. At this orbital position of tool arm 63, tool head 73 and cryoloop 85 are oriented in an upright, generally vertical crystal retrieval position, as shown in FIGS. 11, 14 and 25.

Position control knob 57 is once again manipulated to thus move tool head support arm a short distance upwards and to the left, and then downwards until perceptible contact is made between docking arm 200 and docking switch 202, as shown in FIG. 26. Actuation of docking switch 202 causes a command signal to be issued to stepper motor 71 to rotate counterclockwise, thereby causing pinion and sector gears to mesh and thus tilt tool head 73 about 2 degrees counterclockwise from an orientation of about one-degree clockwise from a generally vertical orientation shown in FIG. 25, to the tilted position shown in FIGS. 12, 15 and 27. As has been described above, this action causes cryofreezer shield plate 192 to pivot clockwise, thus allowing unobstructed flow of cryogas from cryogas 183 onto cryoloop 85 held in tool head. Tool head 73 is held in this position to allow cryogas to freeze cryoloop 85 and the crystal-containing liquid drop held therein, for a period sufficient to freeze the loop, liquid drop and crystal. This time period is preset by an operator input to Freeze Time Duration digiswitch 89 and ranges typically from about 0.1 second to about 4 seconds or more.

Upon expiration of the preset freeze time period, electronic control circuitry 99 outputs a command signal to stepper motor 71 to pivot tool head 73 clockwise to an orientation of about one-degree clockwise from an upright vertical position, as shown in FIG. 25, thus causing cryofreezer shield plate 192 to return to a flow-blocking position. Then, as shown in FIG. 25, a cryoloop 85 and crystal-containing liquid drop frozen thereto may be removed from tool head 73 and placed in a cryogenic storage container. A new cryoloop 85 may then be inserted into tool head 73, to enable repetition of a crystal harvesting cycle.

What is claimed is:

1. A micro-manipulator machine for harvesting crystals from a container, said machine comprising;
    a. a micropositioner mechanism for converting three dimensional translational motions of an input control arm movable by a hand-manipulatable position control member in a first, input coordinate space to motions of a follower mechanism coupled to said input control arm,
    b. a tool head support arm attached at a first, inner end thereof to an output member of said follower mechanism,
    c. a tool head attached to a second, outer end of said tool head support arm, said tool head having attached thereto a tool for extracting a crystal from a container, said tool being movable translationally in response to manipulation of said position control member in a second, output coordinate space in motions which are ratios of corresponding motions of said position control member in said first, input coordinate space,
    d. a first actuator mechanism for moving said tool arm from a first, crystal extraction location proximate a container to a second, crystal retrieval location spaced away from said crystal extracting location, and
    e. a control system for automatically energizing said first actuator mechanism to thereby move tool head to said crystal retrieval position when said tool head has been moved a predetermined distance away from said crystal extraction location by manipulation of said position control knob.

2. The machine of claim 1 wherein said first actuator mechanism includes in combination;
    a. a rotary torque-exertable actuator having an output shaft rotationally adjustable to angular positions in response to input command signals received from said control system,
    b. a crank having a longitudinally disposed base bar and at least a first radially disposed transverse crank arm protruding from said crank bar, said crank arm being fastened at an outer end thereof to said rotary actuator shaft, and said tool head support arm being fastened to said longitudinal base bar of said crank, whereby rotational motion of said actuator shaft about its longitudinal axis effects orbital motion of said base bar and tool head support arm between said first, crystal extraction location and said second, crystal retrieval location.

3. The machine of claim 1 further including a second actuator mechanism for automatically pivoting said tool head towards a source of flowing cryogenic gas for a predetermined time interval in response to movement of said tool head from said retrieval location to a docking location.

4. The machine of claim 3 further including a shutter mechanism for momentarily moving an obstructing shutter member from a blocking to an unblocking orientation to thus allow unobstructed flow of cryogenic gas onto said tool head.

5. The machine of claim 4 wherein said shutter mechanism is so constructed as to cause said shutter member to move to an orientation permitting flow of cryogenic gas onto said tool head in response to pivotable motion of said tool head.

6. The machine of claim 1 further including a tool angle control mechanism for remotely adjusting the orbital location of said tool head support arm to thereby adjust the inclination angle of a tool held in said tool head relative to a container located at said crystal extraction location.

7. The machine of claim 6 wherein said tool angle control mechanism includes a shaft angle encoder having fixed to an input shaft thereof an operator manipulatable tool angle control member, and control electronics in said control system for receiving an electrical input angle signal from said shaft angle encoder and in response thereto energizing said rotary actuator to thereby incrementally adjust said orbital position of said crank with said tool head support arm at said first crystal extraction location to thereby adjust the inclination angle of said tool head commanded by said input angle signal.

8. The machine of claim 7 further including an inclination angle save system including an electronic memory associated with said control electronics for storing therein operator adjusted input inclination angle signals, and inputting said signals to said control electronics to thereby adjust said inclination angle of said tool head to said saved angle value after said tool head has been moved from and returned to said crystal extraction location.

9. The machine of claim 8 wherein said tool angle rotary actuator mechanism includes a limit stop for limiting orbital motion of said crank yoke and tool arm towards said crystal extraction location, said control electronics being responsive to said inclination angle input signal in outputting to said actuator a command signal for rotating said rotary force transducer in small angular increments clockwise and counterclockwise from said limit stop angle position of said yoke.

10. The machine of claim 1 further including;
   a. a cryofreezer station for providing a stream of cryogenic gas,
   b. a second actuator mechanism for moving said tool head to a third, cryofreezing position at which said tool head is impinged by a stream of cryogenic gas from said cryofreezing stations, and
   c. said control system energizing said second actuator mechanism.

11. The machine of claim 10 wherein said first actuator mechanism includes;
   a. a first follower mechanism position sensor for providing a first switch signal in response to motion of said follower mechanism a predetermined distance away from said crystal extraction location,
   b. a crank mechanism including a crank having a radially disposed input arm thereof coupled at an outer end to the output shaft of a rotary actuator mounted on an output member of said follower mechanism, and
   c. said crank having a longitudinally disposed base bar which supports said tool head support arm, whereby angular motion of said output shaft effects orbital motion of said tool head support arm when said rotary actuator is energized by said control electronics in response to said first sensor signal.

12. The machine of claim 11 wherein said second actuator mechanism includes a coaxial shaft extension which extends rearwardly from said tool arm, rotary bearing supports for rotatably supporting said shaft extension in a longitudinally disposed orientation through said base bar of said crank, and a pivot drive mechanism for incrementally rotating said shaft extension and said tool arm to thus pivot said tool head to said third, cryofreezing position.

13. The machine of claim 12 wherein said pivot drive mechanism includes in combination;
   a. a transversely disposed sector gear fixedly mounted with respect to said rotary actuator,
   b. a pinion gear attached to said coaxial shaft extension of said tool arm, said pinion gear being transversely aligned with said sector gear, and
   c. a tool head pivot control mechanism for momentarily incrementing the angular position of said output shaft of said rotary actuator to a position beyond said crystal retrieval position, thus causing said sector gear and said pinion gear to mesh and thereby incrementally rotate said tool head support arm and said tool head towards said cryofreezer station.

14. The machine of claim 13 wherein said tool head pivot control mechanism includes in combination;
   a. a docking arm protruding from said follower mechanism,
   b. a docking switch fixed to said machine support structure, said switch being actuateable by manual control of said micropositioner mechanism to thereby move said tool head support arm a predetermined small distance from said crystal retrieval location to a docking location, and
   c. control circuitry within said control electronics responsive to actuation of said docking switch in providing a command signal of a selectably predetermined time period to be input to said rotary actuator, to thus cause said pinion and sector gears to be rotatably meshed for said predetermined time period.

15. The machine of claim 14 further including a shutter mechanism for momentarily moving an obstructing shutter member from a blocking to an unblocking orientation to thus allow unobstructed flow of cryogenic gas onto said tool head.

16. The machine of claim 15 wherein said shutter mechanism is so constructed as to cause said shutter member to move to an orientation permitting flow of cryogenic gas onto said tool head in response to pivotable motion of said tool head.

17. The machine of claim 16 wherein said shutter mechanism is further defined as including;
   a. a shutter plate pivotably mounted to a fixed member of said machine,
   b. a rotatably contactable member protruding from said shutter plate, and
   c. a rotatably contactable member protruding from said tool arm, said member being so constructed as to cause pivotable motion of said shutter from a first, cryogas obstructing orientation to a second, cryogas flow enabling position in response to rotatable contact between said shutter member and said tool arm member.

18. The machine of claim 17 wherein said rotatably contactable member of said shutter plate is further defined as having a cam surface.

19. The machine of claim 18 wherein said rotatably contactable member of said tool arm is further defined as being a rotatable wheel attached to said tool head support arm.

20. The machine of claim 11 further including a tool angle control mechanism for remotely adjusting the orbital location of said tool head support arm to thereby adjust the inclination angle of a tool held in said tool head relative to a container located at said crystal extraction location.

21. The machine of claim 20 wherein said tool angle control mechanism includes a shaft angle encoder having fixed to an input shaft thereof an operator manipulatable tool angle control member, and control electronics in said control system for receiving an electrical input angle signal from said shaft angle encoder and in response thereto energizing said rotary actuator to thereby incrementally adjust said orbital position of said crank with said tool head support arm at said first crystal extraction location to thereby adjust the inclination angle of said tool head commanded by said input angle signal.

22. The machine of claim 21 further including an inclination angle save system including an electronic memory associated with said control electronics for storing therein operator adjusted input inclination angle signals, and inputting said signals to said control electronics to thereby adjust said inclination angle of said tool head to said saved angle value after said tool head has been moved from and returned to said crystal extraction location.

23. The machine of claim 22 wherein said tool angle rotary actuator mechanism includes a limit stop for limiting orbital motion of said crank yoke and tool arm towards said crystal extraction location, said control electronics being responsive to said inclination angle input signal in outputting to said actuator a command signal for rotating said rotary force transducer in small angular increments clockwise and counterclockwise from said limit stop angle position of said yoke.

* * * * *